United States Patent
Yokoyama et al.

(10) Patent No.: US 12,370,893 B2
(45) Date of Patent: Jul. 29, 2025

(54) HMI CONTROL DEVICE AND NON-TRANSITORY COMPUTER READABLE STORAGE MEDIUM

(71) Applicant: DENSO CORPORATION, Kariya (JP)

(72) Inventors: Shizuka Yokoyama, Kariya (JP); Takeshi Yamamoto, Kariya (JP); Asako Nagata, Kariya (JP); Yuji Ota, Kariya (JP); Takuya Kume, Kariya (JP); Kazuki Kojima, Kariya (JP)

(73) Assignee: DENSO CORPORATION, Kariya (JP)

( * ) Notice: Subject to any disclaimer, the term of this patent is extended or adjusted under 35 U.S.C. 154(b) by 383 days.

(21) Appl. No.: 17/886,581

(22) Filed: Aug. 12, 2022

(65) Prior Publication Data

US 2022/0379727 A1 Dec. 1, 2022

Related U.S. Application Data

(63) Continuation of application No. PCT/JP2021/001270, filed on Jan. 15, 2021.

(30) Foreign Application Priority Data

Feb. 18, 2020 (JP) .................. 2020-025306
Dec. 9, 2020 (JP) .................. 2020-204443

(51) Int. Cl.
 *B60K 35/00* (2024.01)
 *B60K 35/28* (2024.01)
 *B60K 35/29* (2024.01)
(52) U.S. Cl.
 CPC .............. *B60K 35/00* (2013.01); *B60K 35/28* (2024.01); *B60K 35/29* (2024.01); *B60K 2360/161* (2024.01); *B60K 2360/1868* (2024.01); *B60K 2360/195* (2024.01)
(58) Field of Classification Search
 None
 See application file for complete search history.

(56) References Cited

U.S. PATENT DOCUMENTS

| 9,955,319 B2* | 4/2018 | Matus .................... H04W 4/023 |
| 10,604,013 B1* | 3/2020 | Briggs .................... G07C 5/085 |
| 2016/0101728 A1 | 4/2016 | Chan | |
| 2016/0231743 A1* | 8/2016 | Bendewald ............ B60K 35/22 |
| 2017/0210228 A1* | 7/2017 | Katayama .............. B60K 35/81 |
| 2019/0204827 A1* | 7/2019 | Bhalla .................. G05D 1/0061 |

(Continued)

FOREIGN PATENT DOCUMENTS

| JP | H10188067 A | 7/1998 |
| JP | H11281662 A | 10/1999 |

(Continued)

*Primary Examiner* — Justin S Lee
(74) *Attorney, Agent, or Firm* — Harness, Dickey & Pierce, P.L.C.

(57) ABSTRACT

A human machine interface (HMI) device for presenting information recognizably by an occupant of a vehicle capable of autonomous driving is controlled. An acceleration and deceleration state, which is an execution status of acceleration and deceleration control in the vehicle during autonomous driving, is acquired. Acceleration and deceleration information relating to the acceleration and deceleration state is presented in a mode corresponding to the acceleration and deceleration state.

18 Claims, 13 Drawing Sheets

(56) References Cited

U.S. PATENT DOCUMENTS

| | | | |
|---|---|---|---|
| 2020/0282979 A1* | 9/2020 | Kim | B60W 30/0956 |
| 2021/0043083 A1* | 2/2021 | Bandi | G08G 1/096716 |
| 2021/0078407 A1* | 3/2021 | Kim | G01C 21/3658 |
| 2021/0155268 A1* | 5/2021 | Oba | B60W 60/0053 |

FOREIGN PATENT DOCUMENTS

| | | | |
|---|---|---|---|
| JP | 2005024494 A | | 1/2005 |
| JP | 2008292753 A | | 12/2008 |
| JP | 2009003766 A | | 1/2009 |
| JP | 2011016385 A | * | 1/2011 |
| JP | 2016081511 A | | 5/2016 |
| JP | 2016222143 A | | 12/2016 |
| JP | 2017107502 A | | 6/2017 |
| JP | 2018112850 A | | 7/2018 |
| JP | 2019001350 A | | 1/2019 |

* cited by examiner

HMI CONTROL DEVICE AND NON-TRANSITORY COMPUTER READABLE STORAGE MEDIUM

CROSS REFERENCE TO RELATED APPLICATIONS

The present application is a continuation application of International Patent Application No. PCT/JP2021/001270 filed on Jan. 15, 2021, which designated the U.S. and claims the benefit of priority from Japanese Patent Applications No. 2020-025306 filed on Feb. 18, 2020 and No. 2020-204443 filed on Dec. 9, 2020. The entire disclosures of all of the above applications are incorporated herein by reference.

TECHNICAL FIELD

The present disclosure relates to an HMI control device, an HMI control method, and a non-transitory computer readable storage medium for controlling an HMI device for recognizably presenting information to an occupant of a vehicle capable of autonomous driving. HMI stands for human-machine interface.

BACKGROUND

Various autonomous driving systems for vehicles such as automobiles have been proposed (e.g., see Patent Literature 1). During autonomous driving, the driver, who is the driver's seat occupant in the vehicle, can perform the second task. The second task is a task other than the driving operation performed by the driver. The second task is also referred to as a "non-driving task" or a "secondary activity".

SUMMARY

According to an example, an HMI device for presenting information recognizably by an occupant of a vehicle capable of autonomous driving is controlled. An acceleration and deceleration state, which is an execution status of acceleration and deceleration control in the vehicle during autonomous driving, is acquired. Acceleration and deceleration information relating to the acceleration and deceleration state is presented in a mode corresponding to the acceleration and deceleration state.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
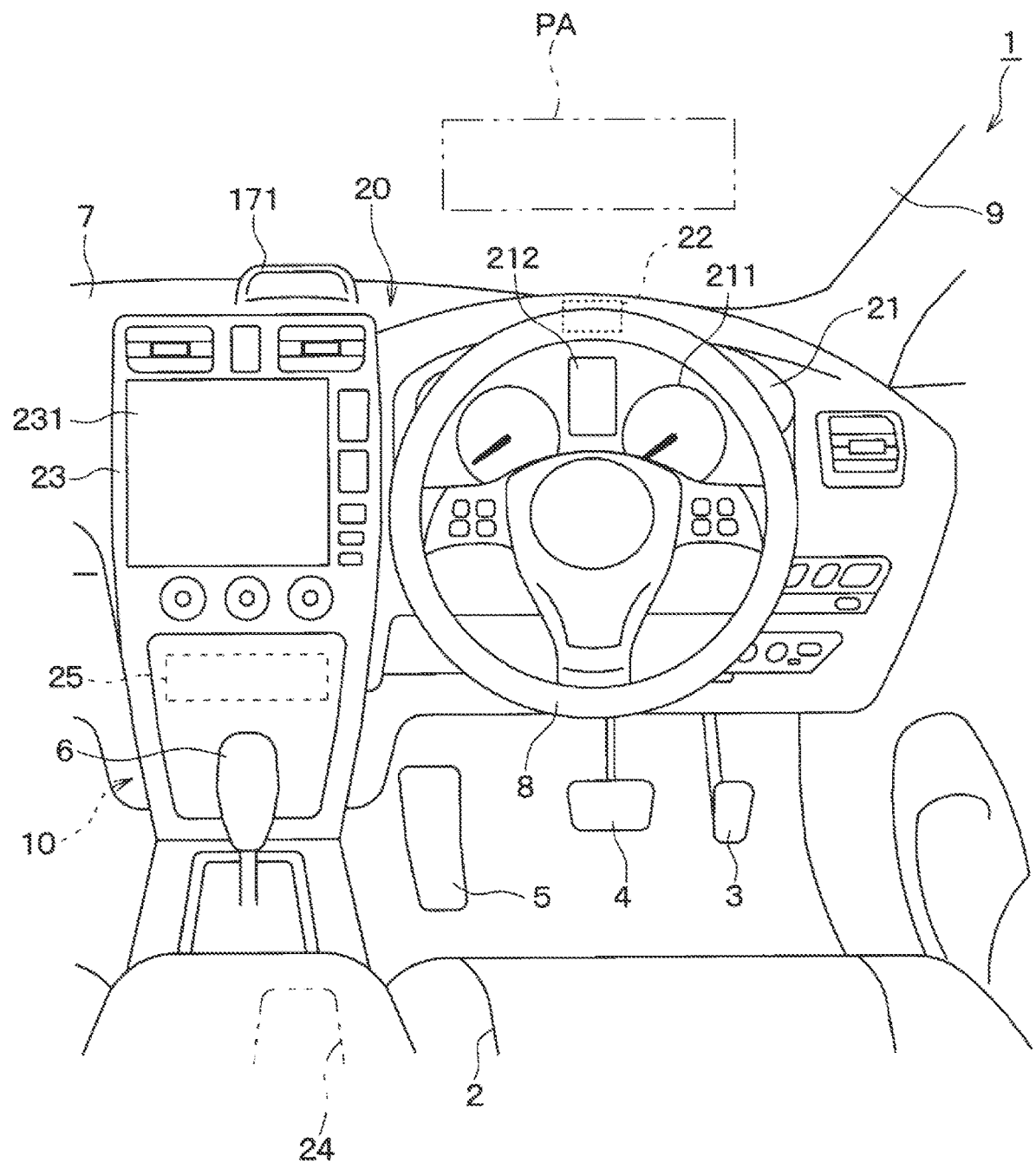
FIG. 1 is a schematic diagram showing the appearance of an interior portion of a vehicle equipped with an in-vehicle system including an HMI control device according to an embodiment.

During automatic driving, the consciousness of the occupants including the driver is often far from the driving state and driving environment of the own vehicle in which the occupant is getting on. For this reason, acceleration/deceleration performed during automatic driving may give anxiety or discomfort to the occupant.

Further, as a second task during automatic driving, for example, viewing of video content, operation of a portable or wearable terminal device brought into a vehicle, and the like may be executed. The "video content" is, for example, a movie, a concert video, a music video, a television broadcast, or the like. The driver's awareness of performing such a second task tends to focus on the second task. Therefore, acceleration/deceleration during execution of the second task may inadvertently surprise the driver.

The present embodiments have been made in view of the circumstances described above and the like. That is, the present embodiments provide a technique that makes it possible to minimize anxiety or discomfort to an occupant due to acceleration/deceleration performed during automatic driving, for example.

According to one aspect of the present embodiments, the HMI control device is configured to control an HMI device that recognizably presents information to an occupant of a vehicle capable of autonomous driving.

This HMI control device includes:

an acceleration and deceleration status acquisition unit that acquires an acceleration and deceleration status, which is an execution status of acceleration and deceleration control in the vehicle during autonomous driving; and an acceleration and deceleration information presentation unit that presents acceleration and deceleration information relating to the acceleration and deceleration status in an manner corresponding to the acceleration and deceleration status.

According to another aspect of the present embodiments, the HMI control method is a method of controlling an HMI device that recognizably presents information to an occupant of a vehicle capable of autonomous driving.

This HMI control method includes the following processes or procedures of:

acquiring an acceleration/deceleration status, which is an execution status of acceleration and deceleration control in the vehicle during automatic driving; and presenting acceleration and deceleration information relating to the acceleration and deceleration status in a mode corresponding to the acceleration and deceleration status.

According to further another aspect of the present embodiments, an HMI control program is a program executed by an HMI control device configured to control an HMI device that recognizably presents information to an occupant of a vehicle capable of autonomous driving.

In this HMI control program, the process executed by the HMI control device includes:

a process of acquiring an acceleration and deceleration status, which is an execution status of acceleration and deceleration control in the vehicle during autonomous driving; and a process of presenting acceleration and deceleration information relating to the acceleration and deceleration status in an manner corresponding to the acceleration and deceleration status.

In addition, in each paragraph in the application document, each element may be provided with a reference numeral in parentheses. In this case, the reference numeral merely indicates an example of the correspondence between the same element and the specific configuration described in the embodiment described later. Therefore, the present disclosure may not be limited at all by the description of the above reference numerals.

Embodiments

In the following, an embodiment of the present disclosure will be described with reference to the drawings. When descriptions of various modifications applicable to one embodiment are inserted in the middle of a series of descriptions concerning the embodiment, the understanding of the embodiment may be hindered. Therefore, the modifications will not be described in the middle of a series of descriptions concerning the embodiment but collectively described thereafter.

First Embodiment: Configuration

Referring to FIG. 1, the vehicle 1 is a so-called ordinary automobile, and is provided with a plurality of passenger seats such as a driver's seat 2 in a vehicle compartment, which is an internal space of a box-shaped vehicle body. The occupant on the driver's seat 2 is hereinafter referred to as a "driver".

An accelerator pedal 3, a brake pedal 4, and a footrest 5 are provided in front of the driver's seat 2. Further, a shift lever 6 is provided diagonally in front of the driver's seat 2. The accelerator pedal 3, the brake pedal 4, and the footrest 5 are arranged below the dashboard 7 provided in front of the driver's seat 2. A steering wheel 8 is attached to a steering column (not shown) extending rearward from the dashboard 7 toward the driver's seat 2. A front windshield 9 is provided above the dashboard 7.

Figure 2:
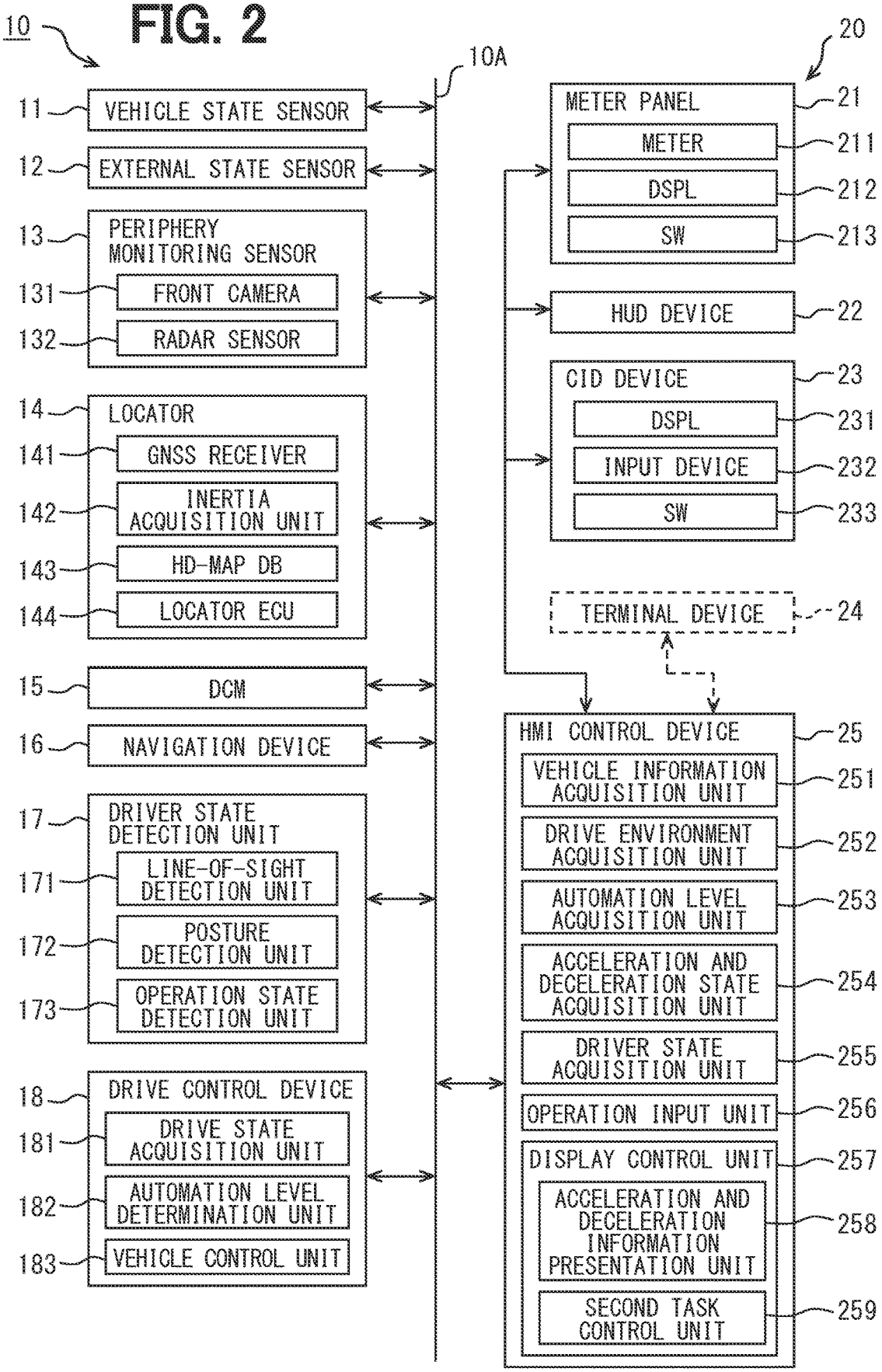
FIG. 2 is a block diagram showing a schematic configuration of the in-vehicle system shown in FIG. 1.

The vehicle 1 is equipped with an in-vehicle system 10. FIG. 2 schematically shows the block configuration of the in-vehicle system 10. Hereinafter, a schematic configuration of the in-vehicle system 10 will be described with reference to FIGS. 1 and 2.

The in-vehicle system 10 is configured to function as a driving automation system in the vehicle 1 by being mounted on the vehicle 1. In the present embodiment, the in-vehicle system 10 has a configuration capable of autonomous driving operation. That is, the vehicle 1 is configured to be capable of autonomous driving by mounting the in-vehicle system 10 thereon. Hereinafter, the vehicle 1 mounted with the in-vehicle system 10 may be referred to as an "own vehicle".

"Autonomous driving" refers to the driving automation level corresponding to levels 3 to 5 in which the driving automation system is in charge of or executes all dynamic driving tasks in the standard "SAE J3016" published by SAE International. SAE stands for Society of Automotive Engineers. The "dynamic driving task" is all operational and tactical functions that need to be performed in real time at the time of operating a vehicle in road traffic, excluding strategic functions. The "strategic function" is a traveling plan, waypoint selection, and the like. The level X in "SAE J3016" is hereinafter simply referred to as "level X". X is any of 0 to 5.

Specifically, the contents of levels 0 to 5 in "SAE J3016" are as follows. The name of the driving automation level described together with each level is not described in "SAE J3016", but is used for convenience in the present specification. In the following level description, "OEDR" is an abbreviation for Object and Event Detection and Response, and is also referred to as "object and event detection and response". OEDR includes monitoring the driving environment. Monitoring of the driving environment includes detection, recognition, and classification of objects and events. Monitoring the driving environment also includes preparation to respond to objects and events as needed. A "limited region" is a specific condition designed to operate a certain driving automation system or its function, and is also referred to as an operation design region or ODD. ODD is an abbreviation for Operational Design Domain. The limited region includes at least one of a plurality of constraints, such as, for example, geographical constraint, environmental constraint, speed constraint, and temporal constraint.

Level 0 indicates a manual operation, and the driver performs all dynamic operation tasks.

Level 1 indicates a driving support operation, and the driving automation system continuously executes in a specific limited region one of a vertical vehicle motion control subtask (i.e., start, acceleration and deceleration, and stop) and a lateral vehicle motion control subtask (i.e., steering) among the dynamic driving tasks. Here, the driving automation system does not execute both the vertical vehicle motion control subtask and the horizontal vehicle motion control subtask at the same time.

Level 2 indicates an advanced driving support, and the driving automation system continuously executes both the vertical vehicle motion control subtask and the lateral vehicle motion control subtask among the dynamic driving tasks in a specific limited region. The driver is expected to supervise the driving automation system by performing OEDR, which is a subtask of the dynamic driving task.

Level 3 indicates a conditional autonomous driving, and the driving automation system continuously performs all dynamic driving tasks in a specific limited region. In general, the driver is not obliged to perform OEDR such as monitoring around the vehicle. Here, if the driving automation level becomes difficult to continue, the driving automation system requests the driver to change the operation with sufficient time. The driver needs to respond appropriately to the request.

Level 4 indicates a highly autonomous driving, and the driving automation system continuously performs all dynamic driving tasks in a specific limited region. In the limited region, the driving automation system handles measures when the driving automation level becomes difficult to continue.

Level 5 indicates a fully autonomous driving, and the driving automation system continuously executes all dynamic driving tasks without any limitation of a specific limited region. The driving automation system also executes the response when the driving automation level becomes difficult to continue, without any limitation of a specific limited region.

In the present embodiment, the in-vehicle system 10 is configured to be able to realize driving automation levels of levels 0 to 3 in the own vehicle. In order to simplify the explanation, in this embodiment, both "high-speed autonomous driving" and "traffic jam autonomous driving" defined below are performed based on the road traffic system. Specifically, the in-vehicle system 10 is configured to be capable of executing "high-speed autonomous driving" and "traffic jam autonomous driving" corresponding to level 3. "High-speed autonomous driving" is automatic driving that enables driving in a predetermined high-speed range with a specific road section as a limited region. The "high-speed autonomous driving" may also be referred to as "high-speed range autonomous driving". The "specific road section" is a road section set in advance to enable autonomous driving at level 3, and is typically a predetermined section set on a dedicated road such as a highway. The predetermined high speed range is, for example, 60 km/h or more and legal speed or less. "Traffic jam autonomous driving" is an automatic driving that follows a vehicle in front at a predetermined speed or less during a traffic jam, and is executed in a traffic jam or a traffic jam section as a limited region. Hereinafter, in the present specification, unless otherwise specified, the expression "autonomous driving" is used when generically referring to level 3 autonomous driving including high-speed autonomous driving and traffic jam autonomous driving.

(Overall System Configuration)

As shown in FIG. 2, the in-vehicle system 10 is an in-vehicle network including an in-vehicle communication line 10A and a plurality of nodes connected to each other via the in-vehicle communication line 10A, and is configured to execute various vehicle controls and various information presentation operations associated therewith during the driving of the own vehicle. The in-vehicle system 10 is configured to conform to a predetermined communication standard such as CAN (international registered trademark: international registered number 1048262A). CAN (international registered trademark) stands for Controller Area Network.

The in-vehicle system 10 includes a vehicle state sensor 11, an external state sensor 12, a periphery monitoring sensor 13, a locator 14, a DCM 15, a navigation device 16, a driver state detection unit 17, a drive control device 18, and an HMI device 20. DCM stands for data communication module. The vehicle state sensor 11 to the HMI device 20 are connected to the in-vehicle communication line 10A.

The HMI device 20 is mounted on the own vehicle so as to be recognizable by the occupants of the own vehicle including the driver. Specifically, the HMI device 20 is configured to provide various information and/or entertainment to the occupants of the own vehicle by means of HMI devices such as a meter panel 21, a HUD device 22, a CID device 23, and a terminal device 24. The HMI device is an electronic device for performing at least one of presenting information to the occupant by displaying an image and/or outputting audio and accepting various input operations from the occupant. HUD stands for head-up display. CID stands for center information display.

The HMI device 20 includes an HMI control device 25 configured to control the output of images and/or audio in the HMI device. That is, the HMI control device 25 is configured to control the operation of the HMI device 20 that constitutes the in-vehicle infotainment system. The meter panel 21, the HUD device 22, and the CID device 23 are connected to the HMI control device 25 so as to be capable of information communication via a sub-communication line different from the in-vehicle communication line 10A. The HMI control device 25 is provided as a node connected to the in-vehicle communication line 10A. Details of the configurations of the HMI device 20 and the HMI control device 25 will be described later.

(Various Sensors)

The vehicle state sensor 11 is provided to generate outputs corresponding to various amounts related to the driving state of the own vehicle. "Amounts related to driving conditions" include, for example, an accelerator opening amount, a braking amount, a shift position, a steering angle, and other quantities related to driving operation conditions by the driver or the driving automation system. The "various amounts related to the driving state" include physical amounts related to the behavior of the own vehicle, such as vehicle speed, angular velocity, longitudinal acceleration, and lateral acceleration. That is, the vehicle state sensor 11 is a generic name of well-known sensors necessary for vehicle driving control, such as an accelerator opening sensor, a steering angle sensor, a wheel speed sensor, an angular velocity sensor, and an acceleration sensor, for simplification of illustration and description. The vehicle state sensor 11 is provided to be able to provide a detection output to each unit such as the drive control device 18 via the in-vehicle communication line 10A.

The external state sensor 12 is provided to generate outputs corresponding to various amounts mainly related to the natural environment among traffic environments around the own vehicle. The "various amounts related to the natural environment" include, for example, physical amounts such as an outside temperature, a rainfall amount, and illuminance. That is, the external state sensor 12 is a generic term for well-known sensors, such as an outside air temperature sensor, a raindrop sensor, and an illuminance sensor, for simplification of illustration and description. The external state sensor 12 is provided to be able to provide a detection output to each unit such as the drive control device 18 via the in-vehicle communication line 10A.

The periphery monitoring sensor 13 is provided so as to mainly detect a driving environment of the own vehicle other than the natural environment. Specifically, the periphery monitoring sensor 13 is configured to be able to detect a moving object and a stationary object in a predetermined detection range around the own vehicle. The "moving object" includes a pedestrian, a cyclist, an animal, and another vehicle that is traveling. The "stationary object" includes a roadside structure (e.g., wall, building, and the like) in addition to an on-road dropped object, a guardrail, a curb, a parked or stopped vehicle, a road sign, and a road marking. The periphery monitoring sensor 13 may also be referred to as an "ADAS sensor". ADAS is an abbreviation for advanced driver assistance systems.

In the present embodiment, the periphery monitoring sensor 13 includes a front camera 131 and a radar sensor 132 as a configuration for detecting a moving object and a stationary object. The front camera 131 is provided to capture the images on the front side and the front lateral side of the own vehicle. The front camera 131 is a digital camera device and includes an image sensor such as a CCD or CMOS. CCD stands for charge-coupled device. CMOS stands for complementary metal-oxide-semiconductor.

The radar sensor 132 is a millimeter-wave radar sensor, a submillimeter-wave radar sensor, or a laser radar sensor configured to transmit and receive radar waves and is mounted in a front surface portion of a vehicle body of the own vehicle. The radar sensor 132 is configured to output a signal corresponding to a position and a relative speed of a reflection point. The "reflection point" is a point at which a radar wave is estimated to have been reflected on the surface of an object present around the own vehicle. The "relative speed" is a relative speed of a reflection point, that is, an object having reflected a radar wave, with respect to the own vehicle.

(Locator)

The locator 14 is configured to acquire highly accurate position information or the like of the own vehicle by so-called complex positioning. Specifically, the locator 14 has a GNSS receiver 141, an inertia acquisition unit 142, a high-precision map DB 143, and a locator ECU 144. The GNSS stands for Global Navigation Satellite System. DB stands for database. ECU is an abbreviation for Electronic Control Unit. The "highly accurate position information" is, for example, position information having a position accuracy such that it can be used for a driving automation level of level 2 or higher, specifically, an error of less than 10 cm.

The GNSS receiver 141 is provided to receive positioning signals transmitted from a plurality of positioning satellites, that is, artificial satellites. In the present embodiment, the GNSS receiver 141 is configured to be capable of receiving positioning signals from positioning satellites in at least one of satellite positioning systems such as GPS, QZSS, GLONASS, Galileo, IRNSS, and Hokuto satellite navigation system. The GPS is an abbreviation for global positioning system. QZSS stands for Quasi-Zenith Satellite System. The GNSS stands for Global Navigation Satellite System. IRNSS stands for Indian Regional Navigation Satellite System.

The inertia acquisition unit 142 is configured to acquire acceleration and angular velocity acting on the own vehicle. In the present embodiment, the inertia acquisition unit 142 is provided as a three-axis gyro sensor and a three-axis acceleration sensor built in a box-shaped housing of the locator 14.

The high-precision map DB 143 is mainly configured by a nonvolatile rewritable memory so as to store high-precision map information in a rewritable manner and to hold the stored contents even during power interruption. The nonvolatile rewritable memory is, for example, a hard disk, EEPROM, flash ROM, or the like. EEPROM is an abbreviation for Electronically Erasable and Programmable ROM. ROM stands for read-only memory. The high-precision map information may also be referred to as high-precision map data. The high-precision map information includes map information with higher precision than map information used in a conventional car navigation system corresponding to a position error of about several meters. Specifically, the high-precision map DB 143 stores information used for driving automation levels of level 2 or higher, such as three-dimensional road shape information, lane number information, regulation information, and the like, in accordance with predetermined standards such as ADASIS standards. ADASIS stands for Advanced Driver Assistance Systems Interface Specification.

The locator ECU 144 is configured as a so-called in-vehicle microcomputer provided with a CPU, a ROM, a RAM, an input/output interface, and the like (not shown). The CPU is an abbreviation for Central Processing Unit. RAM stands for random-access memory. The locator ECU 144 is configured to sequentially determine the position, the direction, and the like of the own vehicle on the basis of the positioning signal received by the GNSS receiver 141, the acceleration and the angular velocity acquired by the inertia acquisition unit 142, the vehicle speed acquired from the vehicle state sensor 11, and the like. Then, the locator 14 is provided so that the determination result of the position, the direction, and the like by the locator ECU 144 can be provided to each part such as the navigation device 16, the drive control device 18, and the HMI control device 25 via the in-vehicle communication line 10A.

(DCM)

The DCM 15 is an in-vehicle communication module and is provided to be able to perform information communication with a base station around the own vehicle by wireless communication conforming to a communication standard such as LTE or 5G. LTE stands for Long Term Evolution. 5G stands for fifth generation.

Specifically, for example, the DCM 15 is configured to acquire the latest high-precision map information from a probe server on a cloud (not shown). Further, the DCM 15 stores the acquired latest high-precision map information in the high-precision map DB 143 by linking with the locator ECU 144. Moreover, the DCM 15 is configured to acquire traffic information such as congestion information from the probe server and/or a predetermined database described above. The "congestion information" includes the position and length of the congestion section. Specifically, the congestion information includes a congestion head position, a congestion end position, an estimated congestion distance, an estimated congestion time, and the like. The traffic information is also referred to as "road traffic information".

(Navigation Device)

The navigation device 16 is provided to calculate a scheduled traveling route from the current position of the own vehicle to a predetermined destination. In the present embodiment, the navigation device 16 is configured to calculate the scheduled traveling route on the basis of a destination set by the driver or the like of the own vehicle, high-precision map information acquired from the locator 14, and position information and direction information of the own vehicle acquired from the locator 14. Further, the navigation device 16 is provided so as to be able to provide various information including the route information which is the calculation result of the planned travel route to each part of the drive control device 18 and the HMI control device 25 via the in-vehicle communication line 10A. That is, the navigation device 16 performs navigation screen display for map display, route display, and the like on the HMI device 20.

(Driver State Detection Unit)

The driver state detection unit 17 is provided to detect the driver state. The "driver state" is the state of the driver in the driver's seat 2 of the own vehicle, and includes at least one of the line-of-sight direction, posture, behavior, psychological state, and the like. Further, the driver state detection unit 17 is provided so that the driver state detection result can be provided to each unit such as the drive control device 18 and the HMI control device 25 via the in-vehicle communication line 10A.

In the present embodiment, the driver state detection unit 17 includes a line-of-sight detection unit 171, a posture detection unit 172, and an operation state detection unit 173. The line-of-sight detection unit 171 is provided so as to detect the direction of the driver's face and/or the direction of the line of sight by image recognition based on an image taken by an in-vehicle camera equipped with an image sensor such as a CCD or CMOS. That is, the line-of-sight detection unit 171 has the same configuration as the DSM device that gives a warning regarding the driver's inattentive driving operation and the like. The DSM is an abbreviation for driver status monitor.

The posture detection unit 172 is provided so as to detect the sitting posture of the driver in the driver's seat 2 by using the above-mentioned in-vehicle camera and/or a physical quantity sensor such as a seating pressure sensor provided inside the driver's seat 2. The operation state detection unit 173 is provided so as to detect the mounted state of the driver's foot on the accelerator pedal 3, the brake pedal 4, and the footrest 5, and the operation state of the accelerator pedal 3 and the brake pedal 4. Further, the operation state detection unit 173 is provided so as to detect the gripping state and the operation state of the steering wheel 8 by the driver.

(Drive Control Device)

The drive control device 18 has a configuration as an "autonomous driving ECU" or an "drive support ECU" that controls a drive automation system. The drive control ECU 18 is provided to control the driving of the own vehicle on the basis of signals and information acquired from the vehicle state sensor 11, the external state sensor 12, the periphery monitoring sensor 13, the locator 14, and the like. Specifically, the drive control device 18 is configured to execute a predetermined drive control operation. In the present embodiment, the "predetermined drive control operation" includes a vehicle control operation, that is, a dynamic driving task execution operation, corresponding to Levels 1 to 3.

In the present embodiment, the drive control device 18 is configured so that the drive automation level in the own vehicle can be set to any one of levels 0 to 3. Further, the drive control device 18 is configured to execute the high-speed autonomous driving operation when the execution condition of the high-speed autonomous driving operation is satisfied, and to execute the traffic jam autonomous driving operation when the execution condition of the traffic jam autonomous driving operation is satisfied.

The drive control device 18 has a configuration as a so-called in-vehicle microcomputer provided with a CPU, a ROM, a non-volatile rewritable memory, a RAM, an input/output interface, and the like (not shown). Specifically, the drive control device 18 includes a drive state acquisition unit 181, an automation level determination unit 182, and a vehicle control unit 183 as functional configurations or functional units realized on the in-vehicle microcomputer.

The drive state acquisition unit 181 is provided to acquire the traveling status of the own vehicle. The "traveling state" includes a driving state, a traffic environment, and the like detected or acquired by the vehicle state sensor 11, the external state sensor 12, the periphery monitoring sensor 13, and the like. Further, the drive state acquisition unit 181 is provided so as to acquire high-precision map information of the current position of the own vehicle and its surroundings and traffic information on the road on which the own vehicle is currently traveling. That is, the drive state acquisition unit 181 acquires information necessary for vehicle control corresponding to levels 1 to 3 from the vehicle state sensor 11, the external state sensor 12, the periphery monitoring sensor 13, the locator 14, the DCM 15, and the like.

The automation level determination unit 182 is provided so as to determine the drive automation level based on the travel condition acquired by the drive state acquisition unit 181. The drive control device 18 is configured to be able to provide the drive automation level determination result by the automation level determination unit 182 to each unit such as the HMI control device 25 via the in-vehicle communication line 10A.

The vehicle control unit 183 is provided to execute a vehicle motion control subtask according to the drive automation level. That is, the vehicle control unit 183 is adapted to execute longitudinal and/or lateral motion control in the own vehicle based on the drive automation level determined by the automation level determination unit 182.

(HMI Device)

The HMI device 20 has a configuration as a so-called "dashboard HMI" including a display device (for example, a meter panel 21, a CID device 23, and the like) provided on the dashboard 7. The HMI device 20 includes a speaker (not illustrated) for performing information presentation by voice.

The meter panel 21 includes a meter 211, a meter display 212, and a meter switch 213. The meter 211 is provided to execute meter display such as vehicle speed, engine rotation speed, cooling water temperature, fuel remaining amount, and the like of the own vehicle.

The meter display 212 is an information display unit or an information display area provided at the center of the meter panel 21 in the vehicle width direction and is provided to display various information such as date and time, outside temperature, traveling distance, and radio receiving stations. In the present embodiment, the meter display 212 has a configuration as a flat panel display such as a liquid crystal display or an organic EL display, which has a substantially rectangular displayable area. EL stands for electroluminescence. The meter switch 213 is provided to be able to receive various operations concerning a display state or display contents in the meter 211 and/or the meter display 212, for example, a reset operation of a trip meter.

The HUD device 22 is provided in front of the driver to display a display image including characters and/or symbols. In the present embodiment, the HUD device 22 is configured to display the display image in AR by projecting the display image light constituting the display image onto a predetermined projection range PA in the front windshield 9. AR is an abbreviation for Augmented Reality.

The CID device 23 is provided at a substantially central portion of the dashboard 7 in the vehicle width direction. The CID device 23 is provided to be able to display a navigation display screen for map display, route display, and the like by the navigation device 16. The CID device 23 is provided to be able to also display information and contents different from those of the navigation display screen. Specifically, the CID device 23 is configured to be able to perform display and setting related to a traveling mode, such as "comfort", "normal", "sports", and "circuit".

Further, the CID device 23 is provided so as to be able to execute a display related to the second task that can be utilized by the driver during autonomous driving. Specifically, for example, the CID device 23 is configured to be capable of executing screen display for viewing video content as a second task.

The CID device 23 has a CID display 231, an input device 232, and a CID switch 233. The CID display 231 is provided substantially at the center of the dashboard 7 in the vehicle width direction, that is, at a position between the driver's seat 2 and a passenger seat, so as to be visually recognizable from at least the driver. The CID display 231 has a configuration as a flat panel display such as a liquid crystal display or an organic EL display. The CID display 231 is configured to display an image of the video content when the second task is viewing the video content.

The input device 232 is a transparent touch panel and is provided to cover the CID display 231 by being stacked over the CID display 231. That is, the input device 232 is configured to be able to accept an input operation by the driver or the like corresponding to the display while visually recognizing the display on the CID display 231 to the driver or the like. The CID switch 233 includes a plurality of manual operation switches disposed around the CID display 231 and the input device 232.

The HMI device 20 has a steering switch and the like in addition to the meter switch 213 and the CID switch 233. The steering switch is provided on a spoke portion or the like of the steering wheel 8. The HMI device 20 is provided so that the acceptance result of the input operation by the driver can be provided to each part of the drive control device 18 and the like via the in-vehicle communication line 10A.

The terminal device 24 is a portable or wearable electronic device brought into the vehicle by an occupant of the vehicle including a driver, and is, for example, a mobile phone, a tablet terminal, a notebook computer, a portable game machine, a smart watch, or the like. When the terminal device 24 is brought into the own vehicle, it is connected to the HMI control device 25 so as to be capable of information communication by short-range wireless communication such as Bluetooth (registered trademark) and TransferJet (registered trademark). That is, the second task also includes the operation of the terminal device 24 by the driver.

(HMI Control Device)

The HMI control device 25 is provided as an HCU that controls the operation of an HMI device such as a meter panel 21 included in the HMI device 20. HCU is an abbreviation for HMI Control Unit.

The HMI control device 25 has a configuration as a so-called in-vehicle microcomputer provided with a CPU, a ROM, a non-volatile rewritable memory, a RAM, an input/output interface, and the like (not shown). Specifically, the HMI control device 25 has the following functional configuration or functional unit realized on a microcomputer. That is, the HMI control device 25 includes a vehicle information acquisition unit 251, a drive environment acquisition unit 252, an automation level acquisition unit 253, an acceleration and deceleration state acquisition unit 254, a driver state acquisition unit 255, and an operation input unit 256, and a display control unit 257.

The vehicle information acquisition unit 251 is provided to acquire information related to the driving condition of the own vehicle. Specifically, the vehicle information acquisition unit 251 acquires various amounts related to the driving state of the own vehicle detected or acquired by the vehicle state sensor 11, from the vehicle state sensor 11.

The drive environment acquisition unit 252 is provided to acquire information related to the driving environment of the own vehicle. Specifically, the drive environment acquisition unit 252 acquires various quantities related to the natural environment around the own vehicle, which are detected or acquired by the external state sensor 12, from the external state sensor 12. Further, the drive environment acquisition unit 252 acquires the object detection result by the periphery monitoring sensor 13, from the periphery monitoring sensor 13. Further, the drive environment acquisition unit 252 acquires the current position of the own vehicle, the planned travel route, and the traffic information including the traffic jam information on the planned travel route from the locator 14 and the navigation device 16.

The automation level acquisition unit 253 is provided so as to acquire the determination result of the operation automation level in the drive control device 18. Specifically, the automation level acquisition unit 253 acquires the determination result of the drive automation level by the automation level determination unit 182 from the drive control device 18.

The acceleration and deceleration state acquisition unit 254 is provided to acquire the acceleration and deceleration state, which is the execution status of the acceleration and deceleration control in the own vehicle during autonomous driving. Specifically, the acceleration and deceleration state acquisition unit 254 receives information regarding the execution or execution schedule of the acceleration and deceleration control from the drive control device 18. The difference between "execution" and "scheduled execution" is whether it is being executed or before it is being executed. The information regarding the execution or execution schedule of the acceleration and deceleration control is, for example, the reason for the acceleration and deceleration control, the acceleration and deceleration speed, the time until the execution start of the acceleration and deceleration control, the time until the execution end of the acceleration and deceleration control, and the like.

The driver state acquisition unit 255 is provided so as to acquire the driver condition. The driver state to be acquired by the driver state acquisition unit 255 includes the second task execution state. The "second task execution state" includes whether or not the second task is executed, the HMI device in which the second task is being executed, the type of the second task content, and the like. Specifically, the driver state acquisition unit 255 acquires the driver state detection result by the driver state detection unit 17, from the driver state detection unit 17. Further, the driver state acquisition unit 255 monitors the second task execution state by the CID device 23 and the terminal device 24 during autonomous driving.

The operation input unit 256 is provided so as to receive an input operation in the HMI device 20 by the occupants of the own vehicle including the driver. Specifically, the operation input unit 256 monitors a state of accepting input operations and results thereof by the meter switch 213, the input device 232, the CID switch 233, the terminal device 24, and the like corresponding to various information presented by the display control unit 257.

The display control unit 257 is provided to control the output operation of the image and/or the sound by the HMI device 20. That is, the display control unit 257 is adapted to present various information to the occupants of the own vehicle including the driver by controlling the image output and the audio output in the HMI device. Further, the display control unit 257 controls the image display and/or the audio output in the second task executed by using the CID device 23. Further, the display control unit 257 is adapted to present various information on the terminal device 24 by cooperating with the terminal device 24 while the driver is executing the second task using the terminal device 24.

In the present embodiment, the display control unit 257 includes an acceleration and deceleration information presentation unit 258 and a second task control unit 259.

The acceleration and deceleration information presentation unit 258 is provided so as to present the acceleration and deceleration information, which is information on the acceleration and deceleration status, in a mode corresponding to the acceleration and deceleration status. Specifically, the acceleration and deceleration information presentation unit 258 presents execution information and reason information as acceleration and deceleration information. The execution information is information corresponding to the execution or execution schedule of acceleration and deceleration control. The time until the execution of the acceleration and deceleration control scheduled to be executed starts is included in the execution information. The reason information is information corresponding to the reason or cause of acceleration and deceleration control. Reasons or causes of acceleration and deceleration control are, for example, interruption of another vehicle, a merging point, speed limit change, deceleration of a vehicle in front, entry into a traffic jam section, resolve of traffic jam, detection of obstacles on the road, approach of an emergency vehicle, and the like. "Interruption of another vehicle" means that another vehicle existing in an adjacent lane changes a traffic lane in front of the own vehicle in the own lane in which the own vehicle is traveling.

When the second task is being executed by the CID device 23, which is a display device that visually displays an image by the occupant, the acceleration and deceleration information presentation unit 258 changes and sets the display mode of the acceleration and deceleration information in the CID device 23 according to the acceleration and deceleration status. Specifically, the acceleration and deceleration information presentation unit 258 displays the acceleration and deceleration information on the CID device 23 more conspicuously as the degree of acceleration and deceleration in the acceleration and deceleration control increases.

The second task control unit 259 is provided to control the execution state of the second task in the HMI device 20 during autonomous driving. In the present embodiment, the second task control unit 259 restricts the execution of the second task according to the acceleration and deceleration status. Specifically, the second task control unit 259 is designed to further restrict the execution of the second task as the degree of acceleration and deceleration in the acceleration and deceleration control increases. Then, the second task control unit 259 stops the execution of the second task when the acceleration and deceleration status is the execution or the execution schedule of the rapid acceleration and deceleration control.

First Embodiment: Operation Outline

Hereinafter, the operation of the HMI control device 25 according to the present embodiment, and the outline of the control method and the control program executed by the operation will be described.

In the drive control device 18, the drive state acquisition unit 181 acquires various information including the traveling status of the own vehicle. Specifically, the drive state acquisition unit 181 acquires the driving state and the traffic environment of the own vehicle from the vehicle state sensor 11, the external state sensor 12, and the periphery monitoring sensor 13. Further, the drive state acquisition unit 181 acquires high-precision map information of the current position of the own vehicle and its surroundings, the planned traveling route, and the traffic information on the planned traveling route from the locator 14 and the navigation device 16.

The automation level determination unit 182 determines the driving automation level to be executed by the in-vehicle system 10 based on the driving condition or the like acquired by the drive state acquisition unit 181. The vehicle control unit 183 executes vehicle speed control, steering control, and the like according to the drive automation level being executed.

The HMI device 20 notifies the occupants of the own vehicle including the driver of the driving automation level being executed or scheduled to be executed by displaying an image and/or by voice. Specifically, for example, the HMI device 20 displays the currently running automation level on the meter display 212 or the like. Further, when the execution of the autonomous driving becomes possible, the HMI device 20 displays on the meter display 212 or the like that the execution of the autonomous driving operation has become possible and the approval operation instruction for accepting the approval operation for starting the autonomous driving. When the approval operation by the driver is accepted, the autonomous driving is started.

During autonomous driving, the driver is not obliged to monitor the surroundings of the own vehicle until there is a request for driving change or a request for driving intervention by the in-vehicle system 10. Further, during autonomous driving, steering control operation and acceleration and deceleration control operation by the driver are not required in principle until there is a request for driving change or a request for driving intervention. Therefore, during autonomous driving, the driver's consciousness may be separated from the driving state and driving environment of the own vehicle until there is a driving change request or a driving intervention request by the in-vehicle system 10.

Therefore, the driver can freely execute the second task during the period in which the autonomous driving operation is stably executed. The "period during which the autonomous driving operation is stably executed" means, for example, that there is no reason for autonomous driving failure and that there is no emergency vehicle control such as sudden acceleration and deceleration, no driving change request, and no driving intervention request according to the failure. The "reason for autonomous driving failure" is, for example, the end of a limited area, detection of a traffic obstacle such as a road obstacle, or the like.

Figure 3:
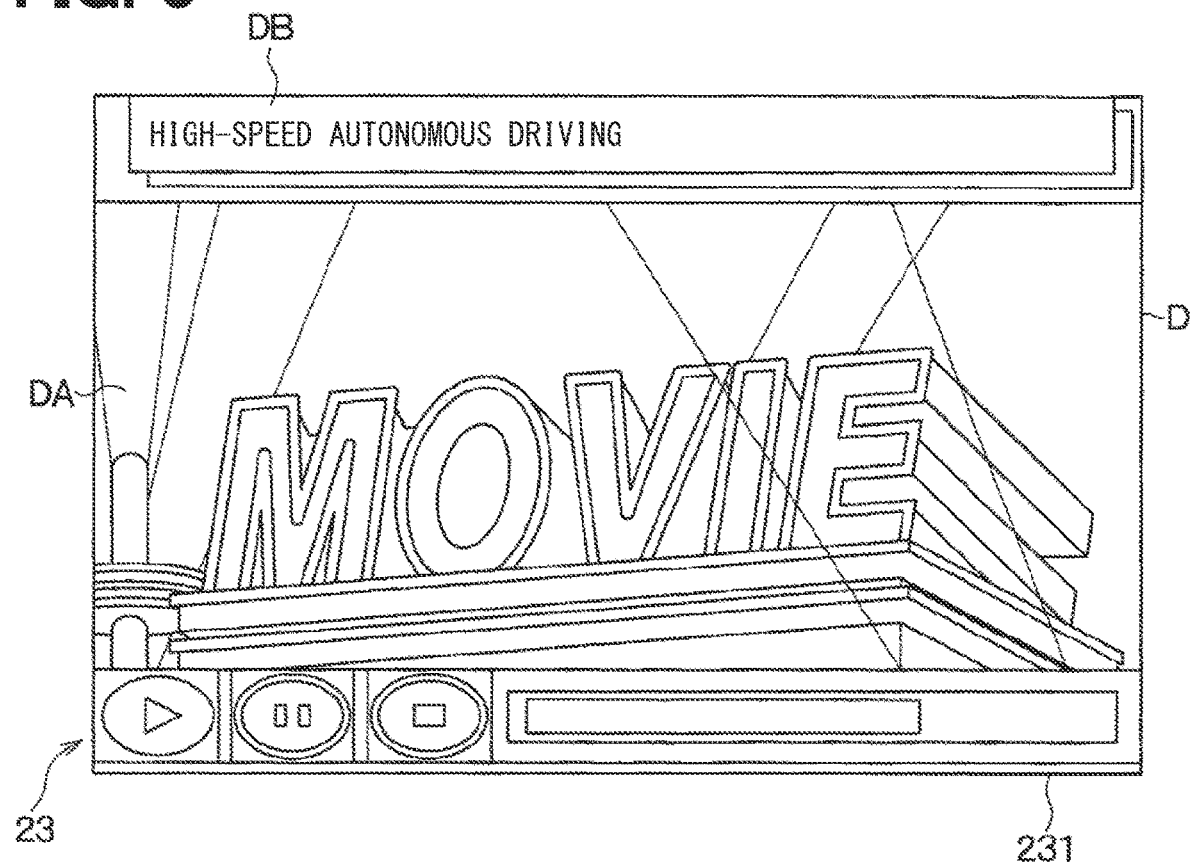
FIG. 3 is a schematic diagram showing a display example of the HMI device according to the first embodiment.

As a typical example, FIG. 3 shows a display example on the CID display 231 while a driver views a video content by the CID device 23 as a second task during a period in which the high-speed autonomous driving operation is stably executed. In this case, the display control unit 257, that is, the second task control unit 259 displays the second task screen DA, which is the video screen of the video content, in most of the screen area D where the image can be displayed on the CID display 231. Specifically, for example, the second task control unit 259 sets the display size of the second task screen DA to be substantially the same as the width of the screen area D (that is, the horizontal dimension) and about 80 to 90% of the height of the screen area D (that is, the vertical dimension). As described above, the maximum display size of the second task screen DA that occupies almost the entire width of the screen area D is hereinafter referred to as "normal size".

On the other hand, the display control unit 257 displays the drive information display DB above the second task screen DA in the screen area D. The drive information display DB includes various information related to the driving state of the own vehicle, such as the execution state or the execution schedule of the drive automation level. In this case, the display control unit 257 sets the display size of the drive information display DB so as to occupy almost the entire area other than the second task screen DA in the screen area D. Specifically, for example, the display size of the drive information display DB in this case is set to a width of about 90% of the width of the screen area D and a height of about 10 to 20% of the height of the screen area D.

(During Acceleration and Deceleration Control: Slow)

For example, the own vehicle may decelerate slowly as the vehicle in front of the own vehicle decelerates in the own lane. It is unlikely that such a gradual change in speed will inadvertently surprise the occupant, and there is little need to present information to the occupant by limiting the utilization of the second task. Therefore, in this case, the display control unit 257 does not display the acceleration and deceleration information on the CID display 231. Further, the second task control unit 259 does not reduce the display size of the second task screen DA from the normal size shown in FIG. 3. In this case, the second task control unit 259 executes the second task as usual, and does not particularly limit the execution of the second task.

Figure 4:
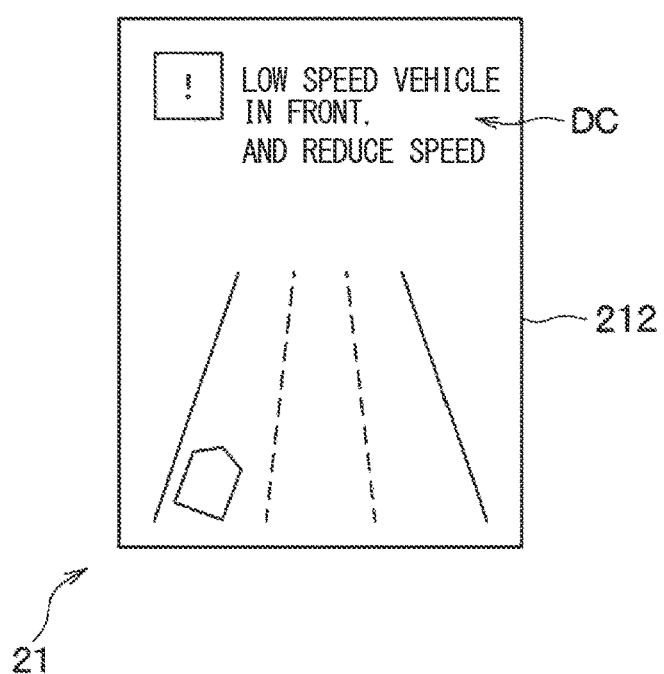
FIG. 4 is a schematic diagram showing a display example of the HMI device according to the first embodiment.

On the other hand, the driver may perform forward view confirmation or driving status confirmation even during the execution of the second task. Therefore, the display control unit 257, that is, the acceleration and deceleration information presentation unit 258, displays the acceleration and deceleration information display DC indicating "There is a low-speed vehicle ahead and decelerates" on the meter display 212, as shown in FIG. 4. The acceleration and deceleration information display DC includes a display of execution information "decelerates" and a display of reason information "there is a low-speed vehicle ahead". Further, the acceleration and deceleration information presentation unit 258 also displays the acceleration and deceleration information on the HUD device 22.

(During Acceleration and Deceleration Control: Medium)

Figure 5:
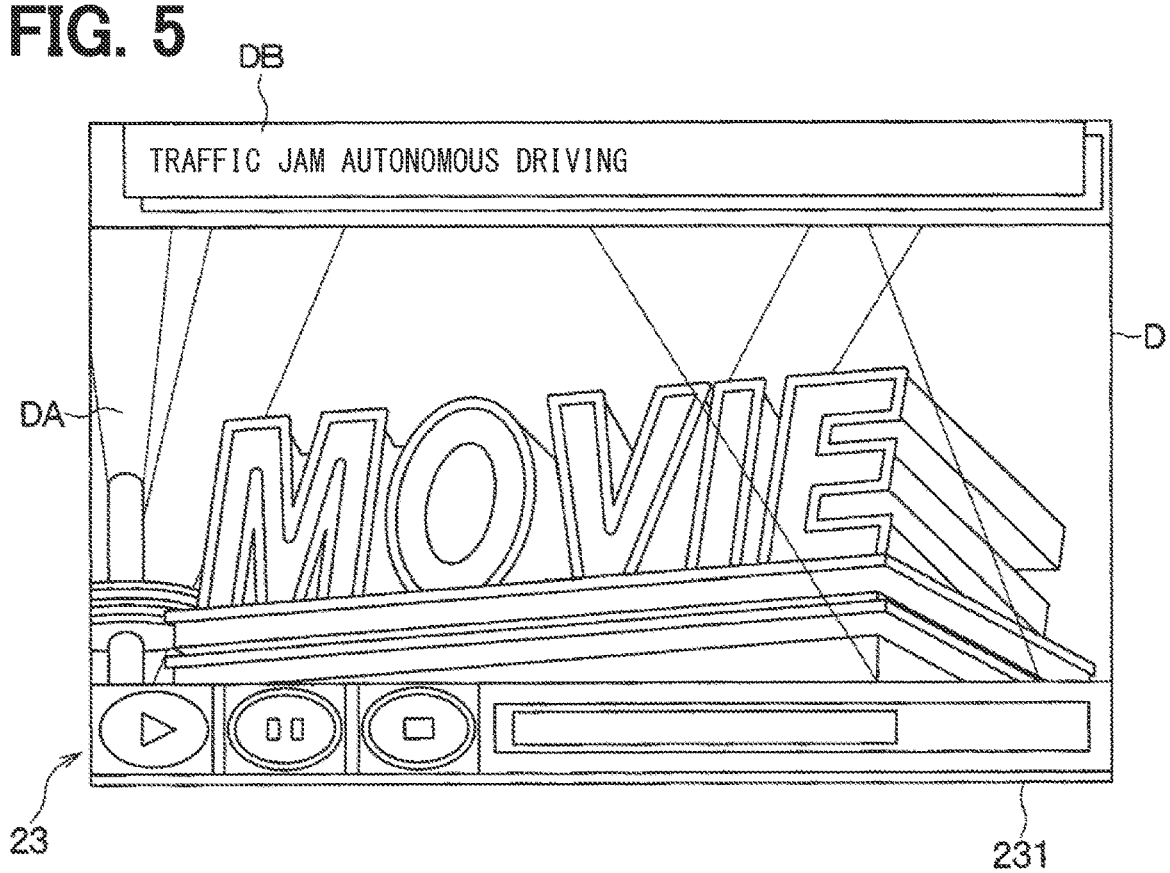
FIG. 5 is a schematic diagram showing a display example of the HMI device according to the first embodiment.

As another typical example, FIG. 5 shows
a display example on the CID display 231 when executing the viewing of the video content by the CID device 23 as a second task during a period in which the traffic jam autonomous driving is stably executed in a specific road section capable of high-speed autonomous driving. Also in this case, the second task control unit 259 displays the second task screen DA in the normal size on the CID display 231. In this case, the second task is executed as usual and is not subject to any particular execution restrictions.

After that, when the traffic jam is resolved, the drive control device 18 ends the traffic jam autonomous driving operation and shifts the drive automation level from the traffic jam autonomous driving operation to the high-speed autonomous driving operation. With the shift of the drive automation level, the drive control device 18 executes acceleration control for speed recovery in the own vehicle. The degree of speed change at this time is slightly larger than the above-mentioned example of slow deceleration accompanying the deceleration of the preceding vehicle, but it is not so large as to give the driver a great sense of anxiety or a great surprise. However, a driver who is focused on the second task may feel a little anxious or a little surprised.

Figure 6:
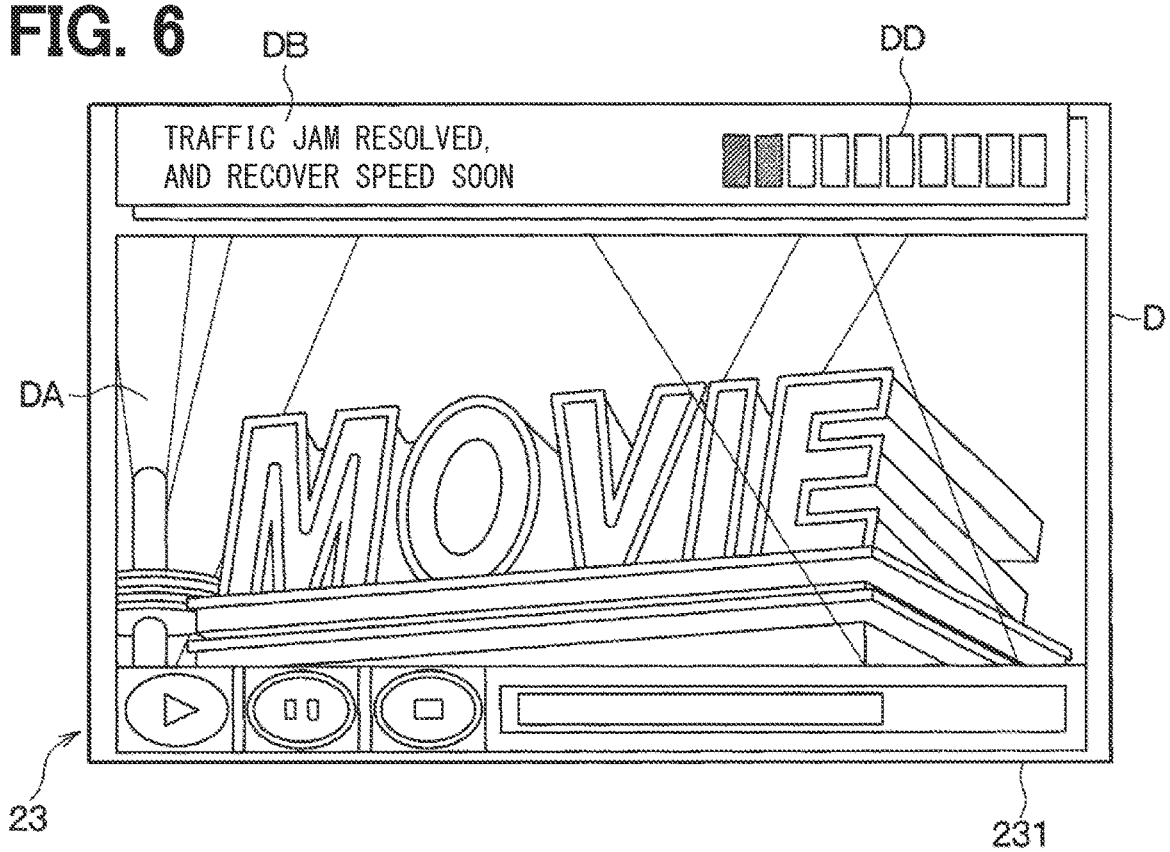
FIG. 6 is a schematic diagram showing a display example of the HMI device according to the first embodiment.

Therefore, when the degree of the acceleration and deceleration speed is medium as described above, the acceleration and deceleration information presentation unit 258 displays the acceleration and deceleration information as the drive information display DB on the CID display 231 as shown in FIG. 6. As a result, it is possible to alert the occupants including the driver appropriately, and to prevent the occupants from feeling anxious or uncomfortable due to acceleration and deceleration as much as possible.

Specifically, in the example of FIG. 6, the acceleration and deceleration information presentation unit 258 displays the acceleration and deceleration information that "the speed will be recovered soon after the traffic jam is resolved" above the second task screen DA in the screen area D. Such acceleration and deceleration information includes execution information that "speed will be recovered soon" and reason information that "congestion is resolved". The acceleration and deceleration information is also displayed by the meter display 212 and the HUD device 22 as in the example of FIG. 4.

Further, the acceleration and deceleration information presentation unit 258 displays the timer display DD as a drive information display DB on the CID display 231. The timer display DD is a graphic display that displays the elapse of the waiting time until the acceleration and deceleration control announced for execution as acceleration and deceleration information is started so that it can be easily and visually grasped. That is, the timer display DD is an information display for presenting the time until the execution start of the acceleration and deceleration control, and the display is started before a predetermined time before the acceleration and deceleration control start time, and the display mode changes with the elapsed time. FIG. 6 shows a display example of a 10-second counter in which the display color and/or the display luminance in 10 blocks arranged in the horizontal direction changes one by one every second as the timer display DD.

When the degree of the acceleration and deceleration is medium, the second task control unit 259 reduces the display size of the second task screen DA slightly (for example, about 10%) from the normal size. On the other hand, the acceleration and deceleration information presentation unit 258 slightly (for example, about 10%) increases the height of the drive information display DB in order to improve the visibility of the drive information display DB and the timer display DD.

Figure 7:
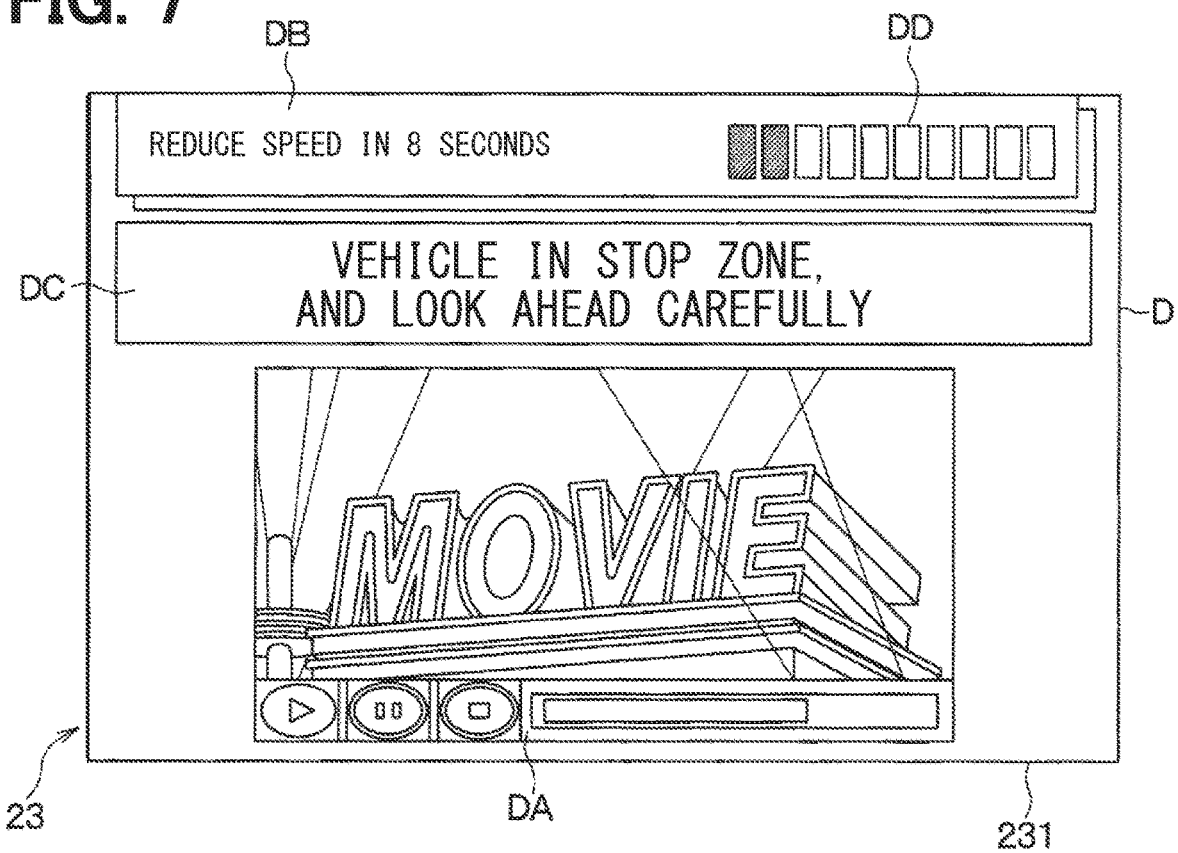
FIG. 7 is a schematic diagram showing a display example of the HMI device according to the first embodiment.

For example, the presence of a stopped vehicle in the emergency stop zone on the shoulder of the road may cause the vehicle to decelerate. In this case, a relatively large degree of deceleration may occur than at the time of speed recovery due to the resolve of traffic congestion. Therefore, in this case, as shown in FIG. 7, the second task control unit 259 reduces the display size of the second task screen DA by a predetermined degree (for example, about 30%) from the normal size. Further, the acceleration and deceleration information presentation unit 258 displays a drive information display DB having acceleration and deceleration information of "Decelerates in XX seconds" and a timer display DD in the screen area D. Further, the acceleration and deceleration information presentation unit 258 displays an acceleration and deceleration information display DC indicating the reason information "There is a stopped vehicle, be careful ahead!" between the drive information display DB and the second task screen DA.

(During Acceleration and Deceleration Control: Rapid)

For example, an obstacle such as a road debris from a preceding freight vehicle may be detected on the road surface in front of the own vehicle during high-speed autonomous driving. In this case, rapid deceleration due to the emergency brake may occur, and it is necessary to make the occupant surely recognize the rapid deceleration.

Figure 8:
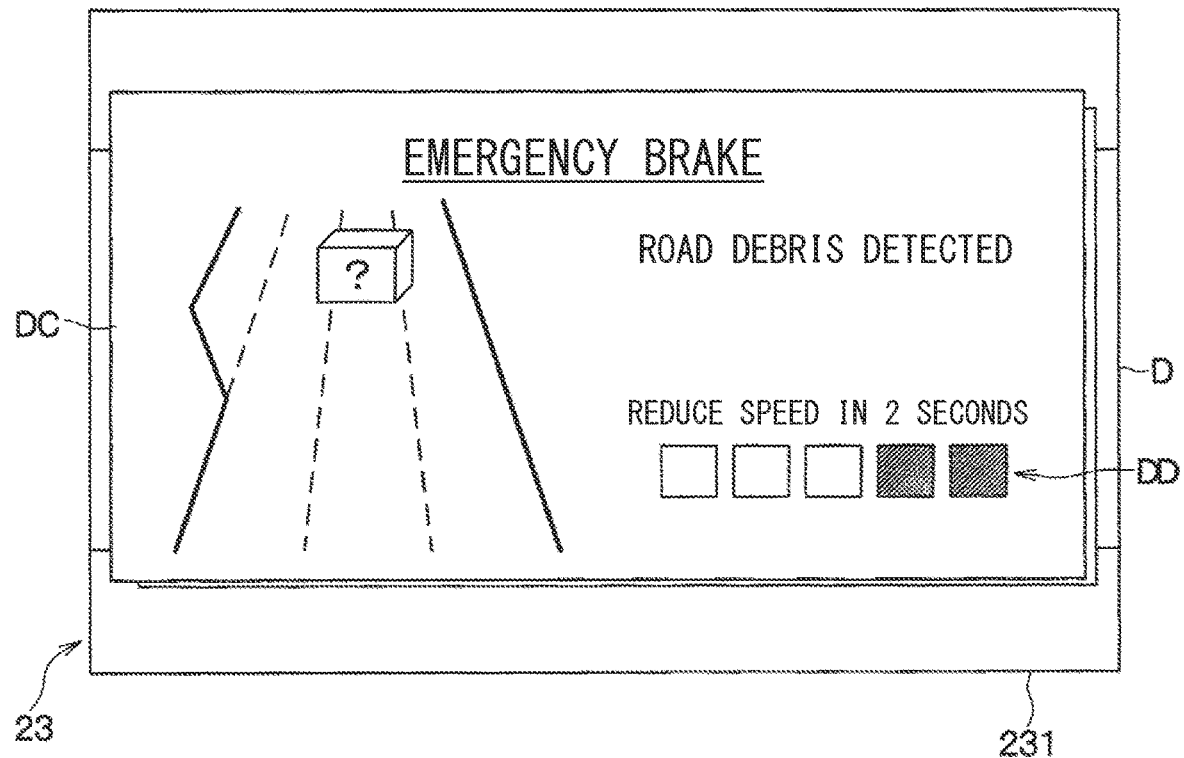
FIG. 8 is a schematic diagram showing a display example of the HMI device according to the first embodiment.

Therefore, in this case, the second task control unit 259 stops the execution of the second task. As a result, the second task screen DA shown in the example of FIG. 3 is erased from the screen area D in the CID display 231 as shown in FIG. 8. On the other hand, the acceleration and deceleration information presentation unit 258 displays the acceleration and deceleration information display DC in most of the screen area D of the CID display 231.

In the example of FIG. 8, the acceleration and deceleration information display DC includes the display of execution information such as "emergency braking!" And "deceleration in XX seconds." Further, the acceleration and deceleration information display DC includes a display of reason information including a text display "a road debris detected" and a graphic display indicating a forward road debris. Further, the acceleration and deceleration information display DC includes a timer display DD of a 5-second counter in which the display color and/or the display luminance in the five blocks arranged in the horizontal direction changes one by one every second.

Operation Example

Figure 9:
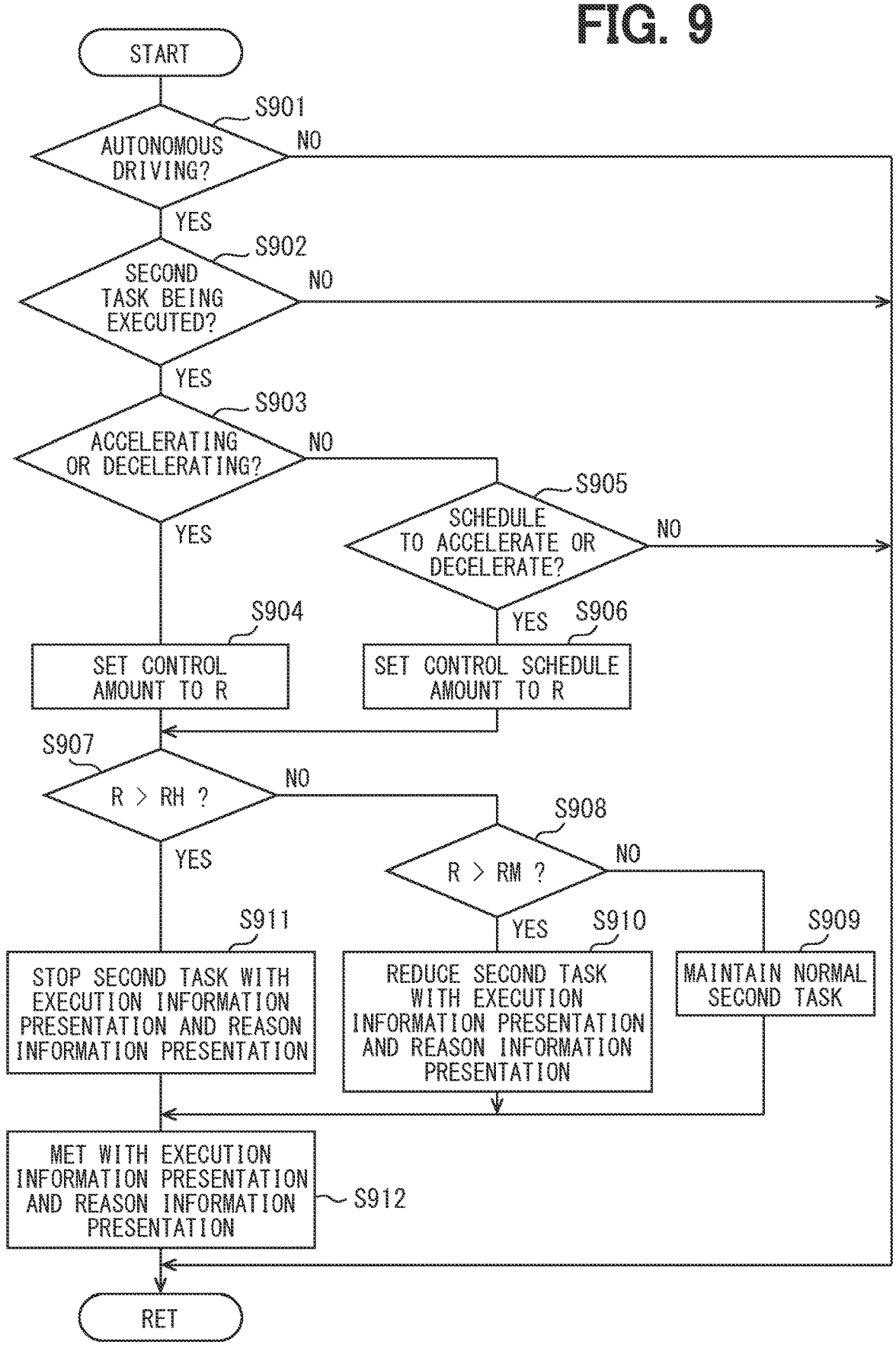
FIG. 9 is a flowchart showing an outline of an operation example of the HMI control device according to the first embodiment.

The flowchart of FIG. 9 shows an operation example of the HMI control device 25, that is, a specific example of the HMI control method and the HMI control program executed by the CPU of the HMI control device 25. In the illustrated flowchart, "S" stands for "step". Hereinafter, the CPU of the HMI control device 25 is simply abbreviated as "CPU". Further, the device configuration, the control method, and the control program according to the present embodiment may be collectively referred to hereinafter simply as "the present embodiment".

The CPU repeatedly activates the control routine shown in FIG. 9 at predetermined time intervals. When such a routine is activated, first, in step 901, the CPU determines whether or not the vehicle is currently in autonomous driving operation.

When the autonomous driving operation is not currently performed (that is, "NO" in step S901), the CPU skips all the processes after step S902 and temporarily ends this routine. On the other hand, when the autonomous driving operation is currently in progress (that is, step "YES" in S901), the CPU advances the process to step S902 or later.

At step S902, the CPU determines whether or not the second task is currently being executed. If the second task is not currently being executed (that is, "NO" in step S902), the CPU skips all the processes after step S903 and temporarily terminates this routine.

If the second task is currently being executed (i.e., "YES" in step S902), the CPU advances the process to step S903. In step S903, the CPU determines whether or not acceleration and deceleration is currently in progress.

If acceleration and deceleration is currently in progress (i.e., "YES" in step S903), the CPU advances the process to step S904. In step S904, the CPU acquires the control amount in the acceleration and deceleration control currently being executed from the vehicle control unit 183, and sets the acquired value as the value of the variable R.

If the vehicle is currently traveling at a constant speed and is not accelerating or decelerating (that is, "NO" in step S903), the CPU advances the process to step S905. In step S905, the CPU determines whether or not the acceleration and deceleration control is scheduled to be executed. When the acceleration and deceleration control is not scheduled to be executed (that is, "NO" in step S905), the CPU skips all the subsequent processes and temporarily terminates this routine.

When the acceleration and deceleration control is scheduled to be executed (that is, "YES" in step S905), the CPU advances the process to step 906. In step S906, the CPU acquires a control schedule amount, that is, a control amount in the acceleration and deceleration control currently scheduled to be executed from the vehicle control unit 183, and sets the acquired value as the value of the variable R.

The CPU sets the value of the variable R in step S904 or step S906, and then advances the process to step S907. In step S907, the CPU compares the variable R with the predetermined value RH.

If the equation of "R≤RH" is established (i.e., "NO" in step S907), the CPU advances the process to step S908. In step S908, the CPU compares the variable R with the predetermined value RM. Here, the equation of "RM<RH" is established.

When the equation of "R≤RM" is established (that is, "NO" in step S908), the control amount in the acceleration and deceleration control during or scheduled to be executed is small, and the acceleration and deceleration due to this is gradual. Therefore, in this case, the CPU advances the process to step S909. In step S909, the CPU does not limit the execution of the second task, and permits the execution of the second task as usual in the state where the autonomous driving operation is stably executed.

When the equation of "RM<R≤RH" (that is, "YES" in step S908), the control amount in the acceleration and deceleration control during or scheduled to be executed is medium. Therefore, in this case, the CPU advances the process to step S910. At step S910, the CPU limits the execution of the second task to a certain extent. That is, the CPU reduces the display size of the second task screen DA according to the value of the variable R. At the same time, the CPU displays the execution information and the reason information in the screen area D having the second task screen DA, and executes the information presentation by voice as necessary.

When the equation of "R>RH" is established (that is, "YES" in step S907), rapid acceleration and deceleration is being executed or is scheduled to be executed. Therefore, in this case, the CPU advances the process to step S911. At step S911, the CPU stops executing the second task. At the same time, the CPU displays execution information and reason information in the screen area D, and executes information presentation by voice as necessary.

After executing any of the processes of step S909 to step S911 depending on the acceleration and deceleration status, the CPU advances the process to step S912. In step S912, the CPU causes the meter display 212 to display execution information and reason information. After that, the CPU temporarily ends this routine.

First Embodiment: Summary

As described above, the present embodiment presents acceleration and deceleration information regarding the acceleration and deceleration status, which is the execution status of the acceleration and deceleration control in the own vehicle during autonomous driving, in a mode corresponding to the acceleration and deceleration status. The "mode" includes at least one of a plurality of elements such as position, size, display timing, display color, display brightness, large-small relationship of the size with the second task screen DA, and positional relationship with the second task screen DA in the screen area D, and the like.

As a result, the acceleration and deceleration information can be appropriately presented to the occupant such as the driver according to the execution status of the acceleration and deceleration control such as the degree of the acceleration and deceleration. Therefore, information relating to the acceleration and deceleration control, which may give anxiety or discomfort to the occupants of the own vehicle during autonomous driving in which the consciousness of the occupants of the own vehicle may be different from the driving state and driving environment of the own vehicle, can be effectively presented. Therefore, according to the present embodiment, it is possible to prevent the occupant from feeling anxious or uncomfortable as much as possible due to the acceleration and deceleration performed during the autonomous driving.

Further, in this embodiment, the execution of the second task is restricted according to the acceleration and deceleration situation. That is, in the present embodiment, when the acceleration and deceleration control is executed during autonomous driving operation, it is determined whether or not to limit the execution of the second task and the degree of the second task execution restriction according to the acceleration and deceleration status. Specifically, in the present embodiment, when the acceleration and deceleration status is the execution or the execution schedule of the rapid acceleration and deceleration control, the execution of the second task is stopped.

According to the present embodiment, the execution of the second task is appropriately restricted according to the acceleration and deceleration situation. As a result, it is possible to effectively present information on acceleration and deceleration control that may cause anxiety or discomfort to the occupants of the own vehicle during the execution of the second task. In addition, it is possible to harmonize the convenience of the second task with the need to present information on acceleration and deceleration. Specifically, for example, when gradual or relatively small acceleration and deceleration control is executed, information on acceleration and deceleration can be presented to the occupant within a range that does not hinder the execution of the second task as much as possible. On the other hand, for example, when medium or rapid acceleration and deceleration control is executed, it is possible to effectively call attention to the occupant who is distracted by the second task.

In this embodiment, when the second task is being executed by the CID device 23, the display mode of the acceleration and deceleration information in the CID device 23 is set according to the acceleration and deceleration status. As a result, it becomes possible to appropriately present information on acceleration and deceleration control to the occupants of the own vehicle such as the driver who are visually recognizing the screen area D including the second task screen DA according to the acceleration and deceleration situation.

In this embodiment, as acceleration and deceleration information, execution information corresponding to the execution or execution schedule of acceleration and deceleration control and reason information corresponding to the reason for acceleration and deceleration control are presented. The execution information includes, for example, the time until the execution of the acceleration and deceleration control is started. This makes it possible to effectively present information so as not to give anxiety or discomfort to the occupant as much as possible due to acceleration and deceleration executed during autonomous driving.

Second Embodiment

Hereinafter, a second embodiment will be described with reference to FIGS. 10 to 13. In the following description of the second embodiment, portions different from those of the first embodiment will be mainly described. In the first embodiment and the second embodiment, portions that are the same or equivalent to each other are denoted by the same reference numerals. Therefore, in the following description of the second embodiment, with respect to constituent elements having the same reference numerals as those in the first embodiment, the description in the first embodiment can be appropriately incorporated unless there is a technical contradiction or a special additional description. The same applies to a third embodiment described later.

The configuration of the in-vehicle system 10 according to the present embodiment is the same as that of the first embodiment. That is, the vehicle 1 and the in-vehicle system 10 according to the present embodiment have the configurations shown in FIGS. 1 and 2. However, in this embodiment, the operation mode and the functional configuration corresponding thereto are slightly different from those in the first embodiment.

It may be preferable to present information to the occupants as effectively as possible. In this regard, if too much information is presented at one time, the formation of correct recognition of the occupant regarding the driving condition or driving environment of the own vehicle may be hindered. On the other hand, by presenting the minimum necessary information in a timely manner, it may be expected that the occupants' awareness of the driving condition or driving environment of the own vehicle will be effectively enhanced.

Figure 10:
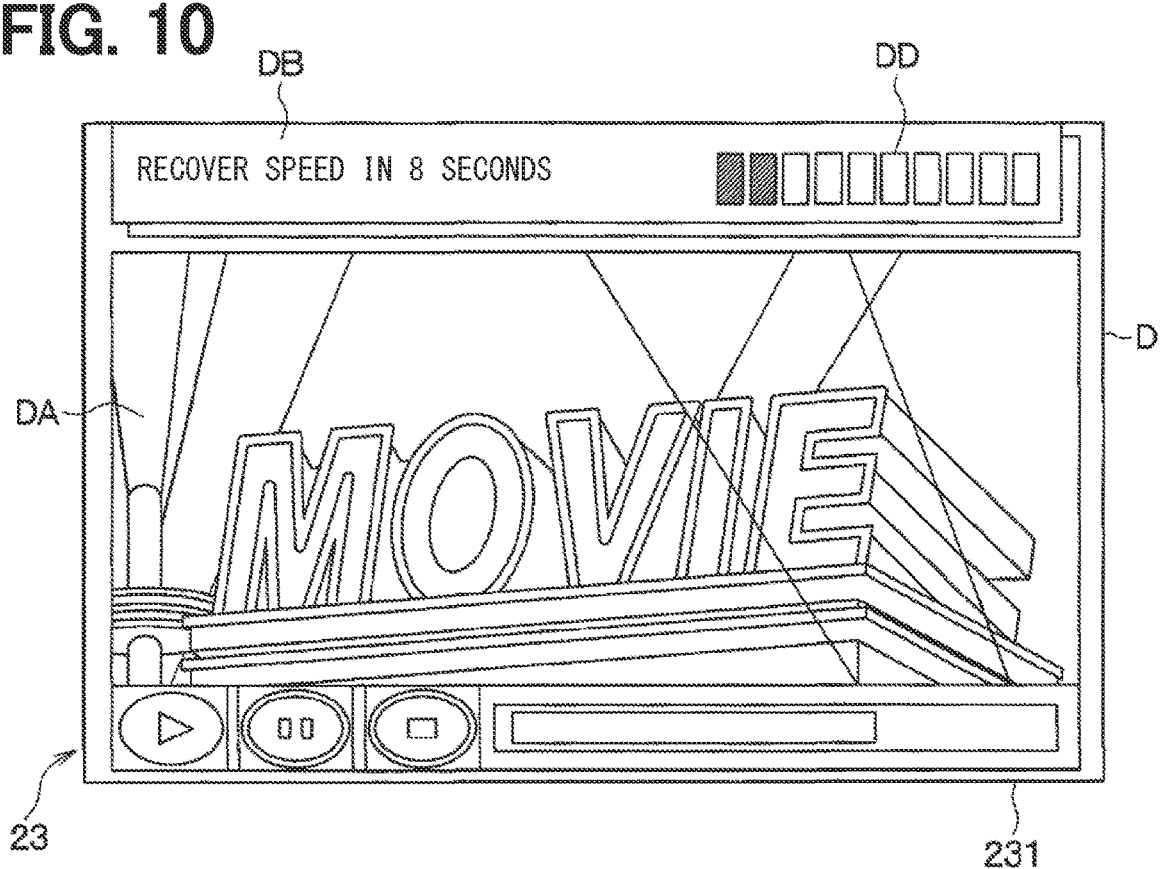
FIG. 10 is a schematic diagram showing a display example of the HMI device according to the second embodiment.
Figure 11:
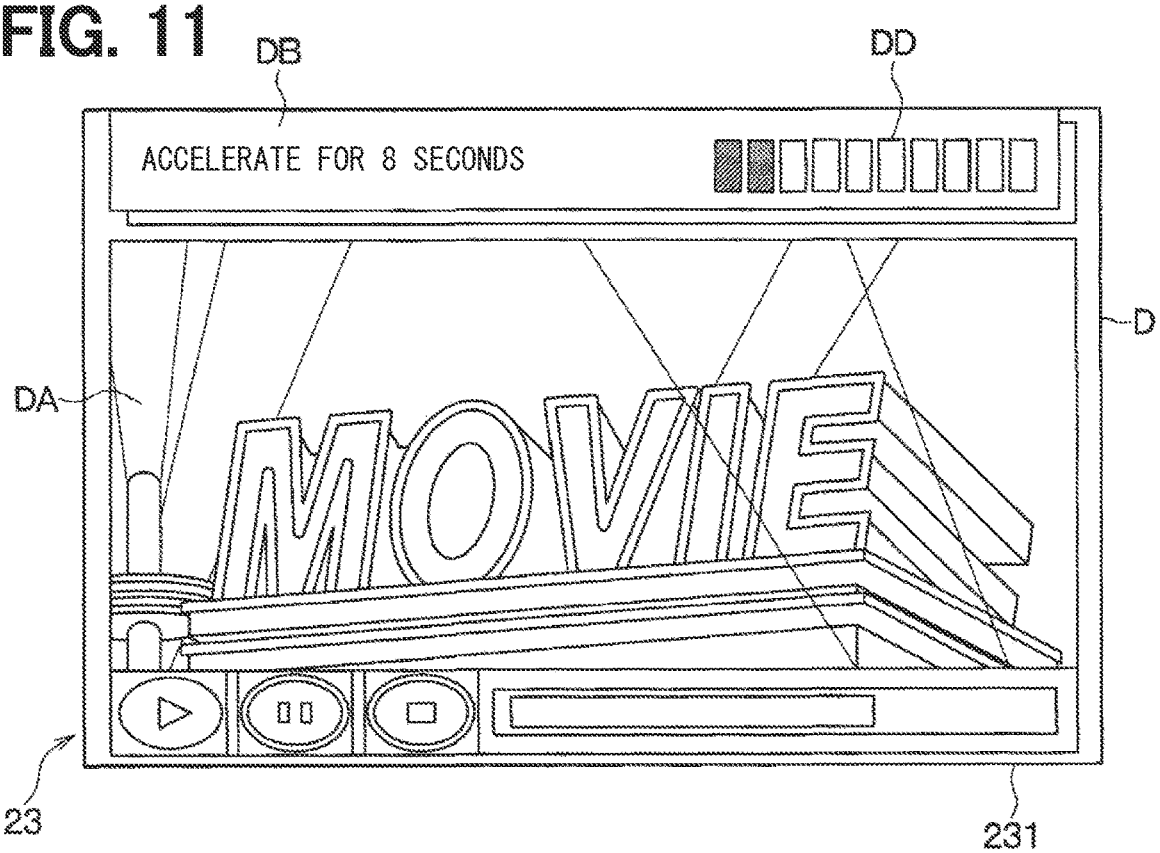
FIG. 11 is a schematic diagram showing a display example of the HMI device according to the second embodiment.
Figure 12:
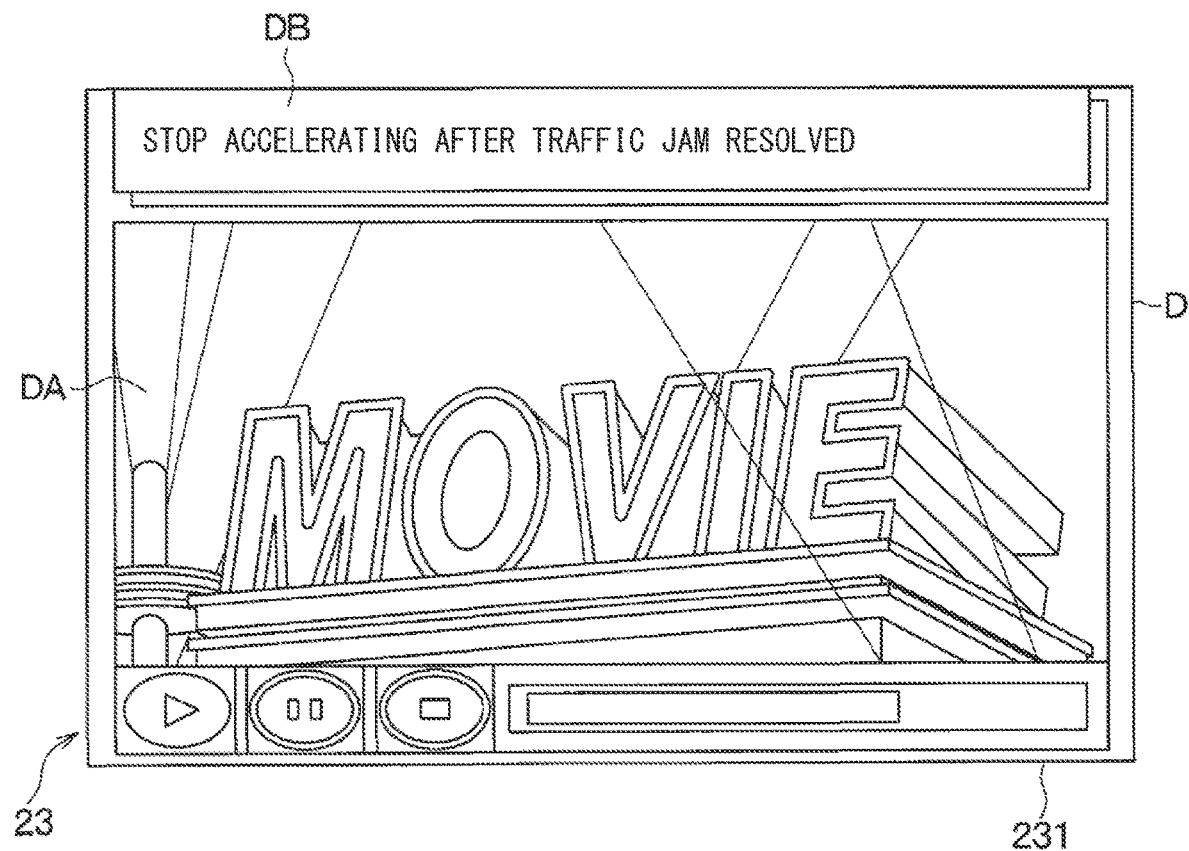
FIG. 12 is a schematic diagram showing a display example of the HMI device according to the second embodiment.

Therefore, in the present embodiment, the acceleration and deceleration information presentation unit 258 presents the execution information and the reason information at different timings. FIGS. 10 to 12 show, as an example, a case where acceleration control for speed recovery is executed in the own vehicle with the end of the traffic jam autonomous driving and the transition to the high-speed autonomous driving as in the example of FIG. 6, as information presentation example, that is, display example.

From the viewpoint of preventing the occupants from feeling anxious or uncomfortable due to the acceleration and deceleration executed during the autonomous driving operation, it may be supposed that the execution schedule notification and the execution notification are more important than reason notification for the occupants in the acceleration and deceleration control. Therefore, in the present embodiment, the execution information presentation, which is the execution schedule notification and the execution notification, precedes the reason information presentation.

Specifically, the acceleration and deceleration information presentation unit 258 displays the execution information "the speed will be recovered in XX seconds" as shown in FIG. 10 as the drive information display DB before the start of the speed recovery control execution. At the same time, the acceleration and deceleration information presentation unit 258 displays the timer display DD. If necessary, information presentation by voice is also executed. Specifically, for example, the execution information "The speed will be recovered in 10 seconds" can be output by voice 10 seconds before the start of the speed recovery control execution, which is the time when the execution information is displayed.

After the "XX" in the execution information display in the above-mentioned drive information display DB is counted down from 10 to 1, the speed recovery control starts. During the speed recovery control, the acceleration and deceleration information presentation unit 258 displays the execution information "accelerate for another XX seconds" as the drive information display DB, as shown in FIG. 11. At the same time, the acceleration and deceleration information presentation unit 258 displays the timer display DD corresponding to the time until the end of the speed recovery control.

When the speed recovery control is completed, the acceleration and deceleration information presentation unit 258 presents the reason information of the speed recovery control together with the execution information of the end of the speed recovery control. Specifically, as shown in FIG. 12, the acceleration and deceleration information presentation unit 258 displays the text information "acceleration at the time of resolving the traffic jam has been completed" as the drive information display DB. At the same time, the acceleration and deceleration information presentation unit 258 outputs voice information that "acceleration at the time of resolving the traffic jam has been completed".

Figure 13:
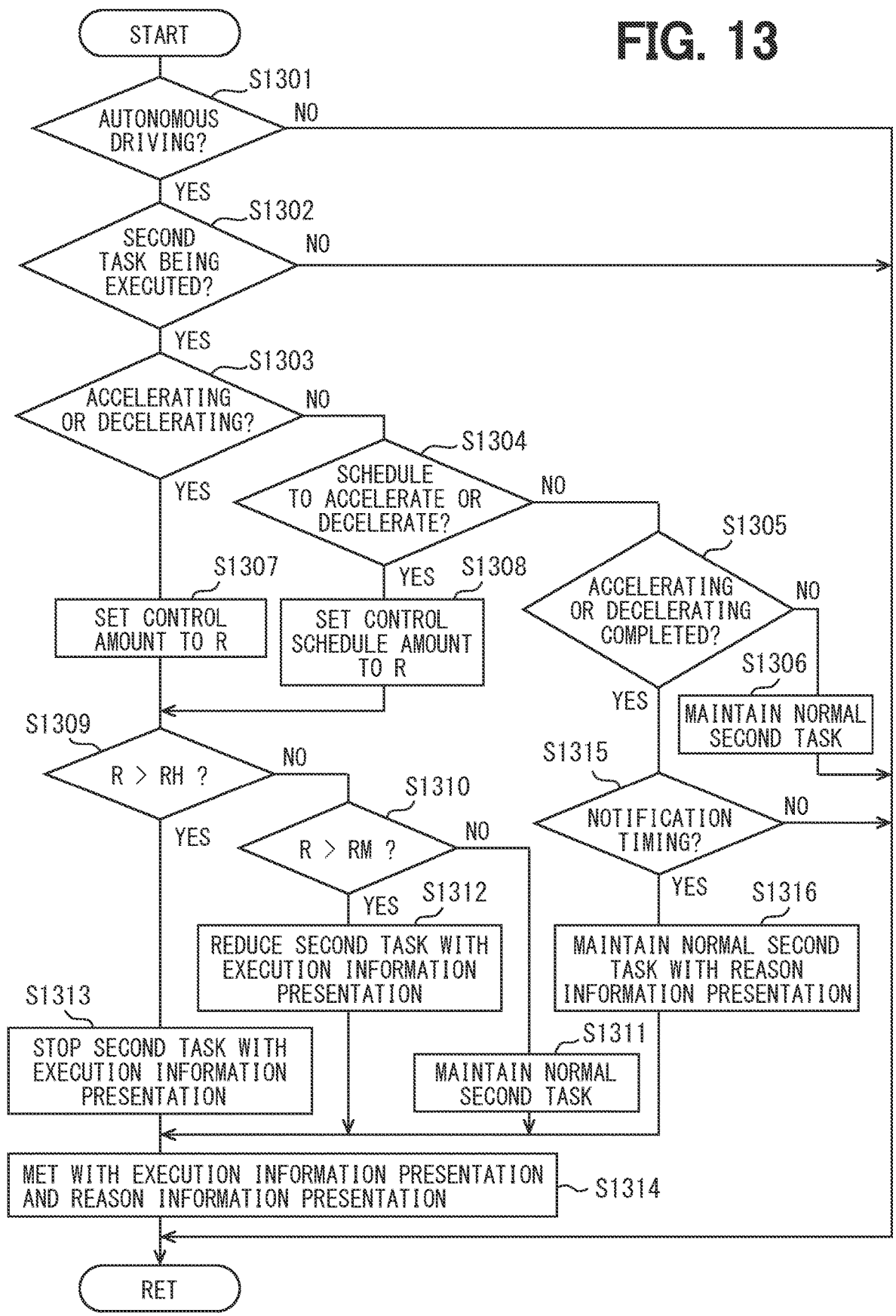
FIG. 13 is a flowchart showing an outline of an operation example of the HMI control device according to the second embodiment.

The flowchart of FIG. 13 shows an operation example of the HMI control device 25 corresponding to the present embodiment, that is, a specific example of the HMI control method and the HMI control program. That is, the flowchart of FIG. 13 is a partially modified version of the flowchart of FIG. 9.

The CPU repeatedly activates the control routine shown in FIG. 13 at predetermined time intervals. When such a routine is activated, first, in step 1301, the CPU determines whether or not the vehicle is currently in autonomous driving operation.

When the autonomous driving operation is not currently performed (that is, "NO" in step S1301), the CPU skips all the processes after step S1302 and temporarily ends this routine. On the other hand, when the autonomous driving operation is currently in progress (that is, step "YES" in S1301), the CPU advances the process to step S1302 or later.

At step S1302, the CPU determines whether or not the second task is currently being executed. If the second task is not currently being executed (that is, "NO" in step S1302), the CPU skips all the processes after step S1303 and temporarily terminates this routine.

If the second task is currently being executed (i.e., "YES" in step S1302), the CPU advances the process to step S1303. At step S1303, the CPU determines whether or not the current situation is that acceleration and deceleration control is being executed. When the acceleration and deceleration control is not being executed (that is, "NO" in step S1303), the CPU advances the process to step S1304.

In step S1304, the CPU determines whether or not the acceleration and deceleration control is scheduled to be executed. When the execution of the acceleration and deceleration control is not scheduled (that is, "NO" in step S1304), the CPU advances the process to step S1305. In step S1305, the CPU determines whether or not the current situation is the situation in which the execution of the acceleration and deceleration control has been completed. That is, the CPU determines whether or not a predetermined time has elapsed from the time when the execution of the acceleration and deceleration control is completed. The determination result in step S1305 is "YES" before a predetermined time elapses from the time when the execution of the acceleration and deceleration control is completed.

When the determination result in step S1305 is "NO", the current situation is neither the execution of the acceleration and deceleration control nor the end of the execution of the acceleration and deceleration control, nor is the acceleration and deceleration control scheduled to be executed. That is, the current situation is a situation in which autonomous driving operation is stably executed. Therefore, in this case, the CPU advances the process to step S1306. In step S1306, the CPU does not limit the execution of the second task, and permits the execution of the second task as usual in the state where the autonomous driving operation is stably executed. After that, the CPU temporarily ends this routine.

If acceleration and deceleration is currently in progress (i.e., "YES" in step S1303), the CPU advances the process to step S1307. In step S1307, the CPU acquires the control amount in the acceleration and deceleration control currently being executed from the vehicle control unit 183, and sets the acquired value as the value of the variable R.

When the acceleration and deceleration control is scheduled to be executed (that is, "YES" in step S1304), the CPU advances the process to step S1308. In step S1308, the CPU acquires a control schedule amount, that is, a control amount in the acceleration and deceleration control currently scheduled to be executed from the vehicle control unit 183, and sets the acquired value as the value of the variable R.

The CPU sets the value of the variable R in step S1307 or step S1308, and then advances the process to step S1309. In step S1309, the CPU compares the variable R with the predetermined value RH.

If the equation of "R≤RH" is established (i.e., "NO" in step S1309), the CPU advances the process to step S1310. In step S1310, the CPU compares the variable R with the predetermined value RM.

If the equation of "R≤RH" is established (i.e., "NO" in step S1310), the CPU advances the process to step S1311. In step S1311, the CPU does not limit the execution of the second task, and permits the execution of the second task as usual in the state where the autonomous driving operation is stably executed.

If the equation of "RM<R≤RH" is established (i.e., "YES" in step S1310), the CPU advances the process to step S1312. At step S1312, the CPU limits the execution of the second task to a certain extent. That is, the CPU reduces the display size of the second task screen DA according to the value of the variable R. At the same time, the CPU displays the execution information in the screen area D having the second task screen DA, and executes the information presentation by voice as necessary.

If the equation of "R>RH" is established (i.e., "YES" in step S1309), the CPU advances the process to step S1313. At step S1313, the CPU stops executing the second task. At the same time, the CPU displays the execution information in the screen area D and executes the information presentation by voice as needed.

After executing any of the processes of step S1311 to step S1313 depending on the acceleration and deceleration status, the CPU advances the process to step S1314. In step S1314, the CPU causes the meter display 212 to display execution information and reason information. After that, the CPU temporarily ends this routine.

When the current situation is the situation where the execution of the acceleration and deceleration control is completed (that is, "YES" in step S1305), the CPU advances the process to step S1315. In step S1315, the CPU determines whether or not the current situation is the notification timing of the reason information. The notification timing of the reason information is a period from the time when the execution of the acceleration and deceleration control is completed until the predetermined notification time elapses.

When it is the notification timing of the reason information (that is, "YES" in step S1315), the CPU advances the process to step S1316. At step S1316, the CPU displays the reason information in the screen area D having the second task screen DA, and executes the information presentation by voice as necessary. Further, the CPU sets the execution mode of the second task to the normal mode as in step S1311. After that, the CPU temporarily ends this routine. When the notification timing of the reason information ends (that is, "NO" in step S1315), the CPU skips the process of step S1316 and temporarily ends this routine.

Third Embodiment

Hereinafter, a third embodiment will be described with reference to FIG. 14. The configuration of the in-vehicle system 10 according to the present embodiment is the same as that of the first embodiment and the second embodiment. In this embodiment, the operation mode and the functional configuration corresponding thereto are slightly different from the first embodiment and the second embodiment.

Depending on the driver, even relatively slow acceleration and deceleration may make the driver feel uneasy. The psychological state such as the driver's anxiety can be estimated by the change in the line-of-sight direction. The line-of-sight direction of the driver can be detected by the driver state detection unit 17.

Therefore, in the present embodiment, the acceleration and deceleration information presentation unit 258 presents acceleration and deceleration information in a mode corresponding to the driver state acquired by the driver state acquisition unit 255. Specifically, for example, when the driver state detection unit 17 detects that the driver's anxiety is large, the acceleration and deceleration information presentation unit 258 sets a predetermined value RH and a predetermined value RM, to be compared with the variable R corresponding to the acceleration and deceleration rate, to be small. The correspondence between the change in the line-of-sight direction and the feeling of anxiety can be described in, for example, a table stored in advance in the non-volatile rewritable memory or a look-up table. The table or look-up table can be optimized by learning the detection result of the driver's line-of-sight direction change due to actual acceleration and deceleration.

Figure 14:
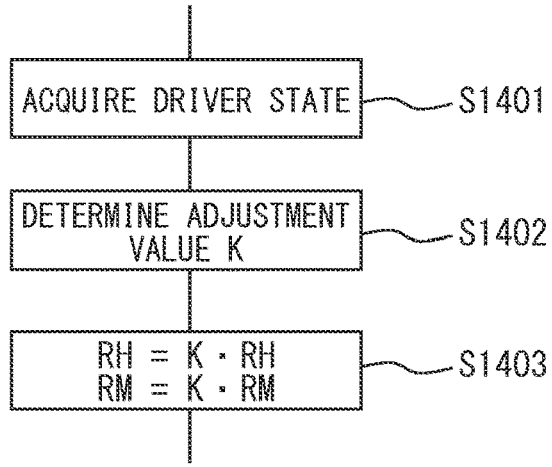
FIG. 14 is a flowchart showing an outline of an operation example of the HMI control device according to the third embodiment.

FIG. 14 shows an operation example of the HMI control device 25 corresponding to the present embodiment, that is, a specific example of the HMI control method and the HMI control program. That is, FIG. 14 is a part of a flowchart showing the HMI control method and the HMI control program in the present embodiment. Specifically, the processes of steps S1401 to S1403 shown in FIG. 14 are executed immediately before step S907 in FIG. 9 or immediately before step S1309 in FIG. 13.

In step S1401, the CPU acquires the driver state detection result by the driver state detection unit 17 from the driver state detection unit 17. After that, the CPU advances the process to step S1402.

In step S1402, the CPU determines the adjustment value K based on the driver state acquired in step S1401. Here, the equation of "$0<K\leq1$" is established. After that, the CPU advances the process to step S1403.

In step S1403, the CPU reads the predetermined values RH and RM stored in advance in the ROM or the like and temporarily stores them in the RAM. Then, the CPU corrects the predetermined values RH and RM by multiplying the temporarily stored values RH and RM by the adjustment value K.

Fourth Embodiment

Hereinafter, a fourth embodiment will be described. The configuration of the in-vehicle system 10 according to the present embodiment is the same as that of the first embodiment. However, in this embodiment, the operation mode and the functional configuration corresponding thereto are slightly different from those in the first embodiment.

For example, acceleration and deceleration control may be executed when the own vehicle approaches or enters a traveling section having a predetermined road shape, and/or when the vehicle leaves the traveling section. Alternatively, for example, acceleration and deceleration control may be executed due to changes in weather. Specifically, for example, when rainfall or snowfall is detected, deceleration control may be executed. Alternatively, for example, acceleration and deceleration control may be executed in relation to another vehicle. Specifically, deceleration control may be executed, for example, in the case of interruption of another vehicle, in the case of being overtaken by an emergency vehicle approaching from behind, and the like. On the other hand, when the vehicle in front of the own vehicle in the own lane accelerates or changes lanes to an adjacent lane, acceleration control may be executed.

The reasons for acceleration and deceleration control as described above can be classified into road shapes and specific scenes. The "specific scene" is a driving environment of the own vehicle (for example, traffic conditions, weather, and the like) that does not include the road shape. When the reason for the acceleration and deceleration control relates to the road shape, the acceleration and deceleration control is relatively gradual and can be predicted to some extent by an occupant such as a driver. On the other hand, when the reason for the acceleration and deceleration control relates to a specific scene, the acceleration and deceleration control may be relatively steep and difficult to predict.

Therefore, in the present embodiment, the second task control unit 259 determines the execution restriction mode of the second task according to the type of the reason for the acceleration and deceleration control. Specifically, the second task control unit 259 increases the degree of restriction on the execution of the second task in the case of acceleration and deceleration control based on a specific scene than in the case of acceleration and deceleration control based on the road shape. As a result, the second task can be more appropriately restricted depending on the reason for the acceleration and deceleration control.

Figure 15:
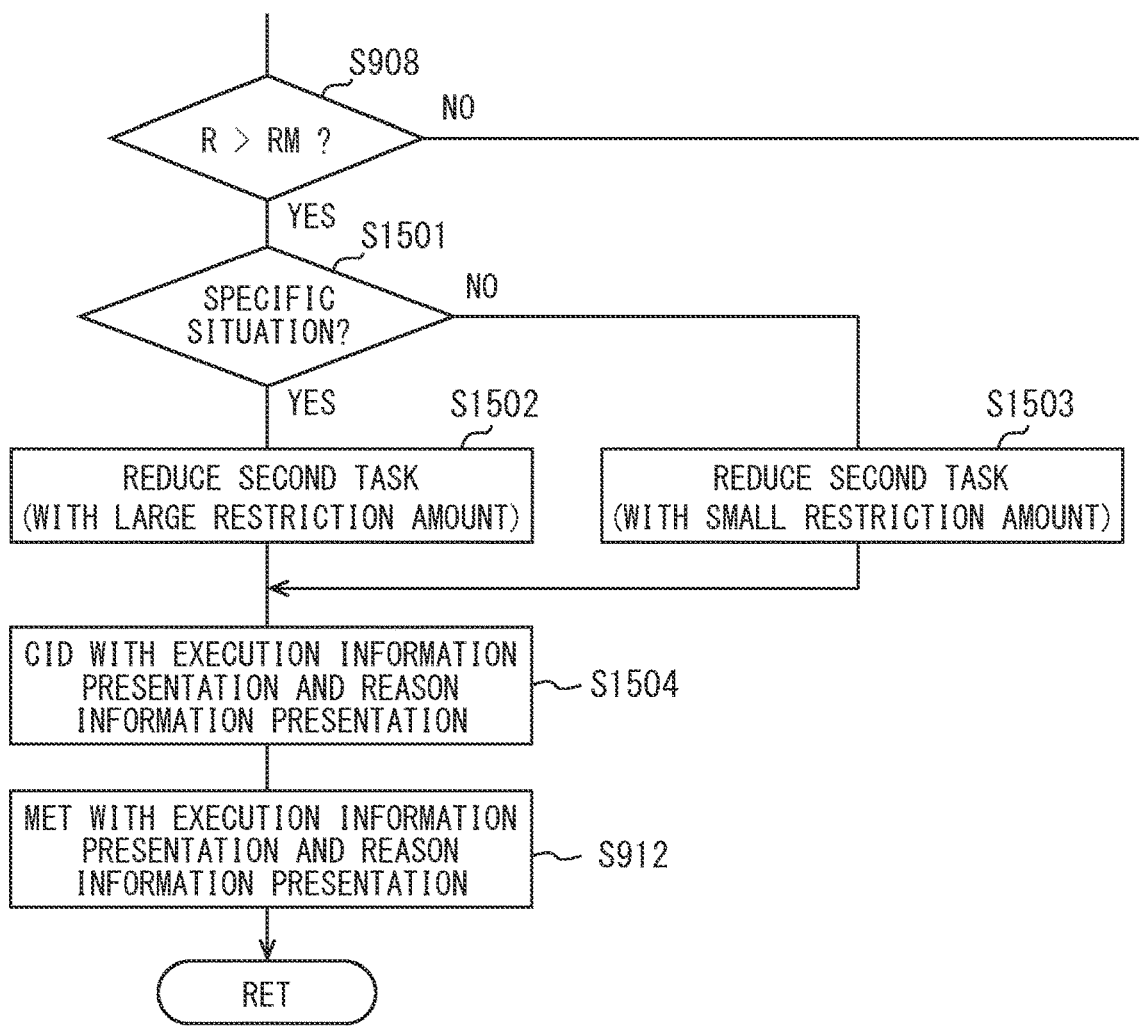
FIG. 15 is a flowchart showing an outline of an operation example of the HMI control device according to the fourth embodiment.

FIG. 15 shows, when the flowchart of FIG. 9 corresponding to the first embodiment is transformed into the embodiment corresponding to the present embodiment, the transformed portion and the peripheral portion thereof which are extracted. Subsequent processing when the equation of "$R>RH$" is established (that is, "YES" in step S907 in FIG. 9) and when the equation of "$R\leq RM$" (that is, "NO" in step S908) is the same as that of the first embodiment.

When the equation of "$RM<R\leq RH$" is established, that is, when the control amount in the acceleration and deceleration control during or scheduled to be executed is medium (that is, "YES" in step S908), the CPU advances the process to step S1501. In step S1501, the CPU determines whether the reason for the acceleration and deceleration control relates to a specific scene or a road shape.

When the reason for the acceleration and deceleration control relates to a specific scene (that is, "YES" in step S1501), the CPU advances the process to step S1502. For example, in the above example, the case where the own vehicle decelerates due to the approach of an emergency vehicle, the interruption of another vehicle, the weather change, or the like corresponds to the acceleration and deceleration control according to a specific scene. In step S1502, the CPU sets the execution restriction degree of the second task, that is, the execution limit amount to "large". Specifically, the CPU increases the reduction amount or the reduction degree of the display size of the second task screen DA.

When the reason for the acceleration and deceleration control relates to the road shape (that is, "NO" in step S1501), the CPU advances the process to step S1503. For example, the case where the own vehicle decelerates before entering the curve, accelerates after passing the curve, or accelerates or decelerates by approaching the road slope corresponds to the acceleration and deceleration control based on the road shape. If the vehicle catches up at the end of the congestion section headed by the preceding vehicle that has decelerated on the uphill slope, the direct reason for deceleration control is congestion, so the reason for acceleration and deceleration control does not relates to "a road shape" but a "specific scene". In step S1503, the CPU sets the execution restriction amount of the second task to "small". Specifically, the CPU decreases the reduction amount or the reduction degree of the display size of the second task screen DA.

In this way, the CPU executes the process of step S1502 or step S1503 depending on the type of reason for acceleration and deceleration control. That is, the CPU limits the execution of the second task based on the restriction mode set by the process of step S1502 or step S1503. Then, after executing the process of step S1504, the CPU advances the process to step S912. In step S1504, the CPU displays execution information and reason information in the screen area D of the CID device 23, and executes information presentation by voice as necessary. That is, the processing contents of steps S1501 to S1504 correspond to a specific example of the processing contents of step 910 in FIG. 9.

Fifth Embodiment

Hereinafter, a fifth embodiment will be described. The configuration of the in-vehicle system 10 according to the present embodiment is the same as that of the first embodiment. However, in this embodiment, the operation mode and the functional configuration corresponding thereto are slightly different from those in the fourth embodiment.

In each of the above specific examples regarding the reason for acceleration and deceleration control, in general, in the case of acceleration control, it is predictable to some extent by a occupant such as a driver, and the acceleration ratio is also relatively small. On the other hand, in the case of deceleration control, there is a high possibility that the vehicle will be decelerated unexpectedly for an occupant such as a driver, and the degree of deceleration may be relatively large. Therefore, it is more necessary to properly alert the occupants such as the driver in the deceleration control than in the acceleration control.

Therefore, in the present embodiment, the acceleration and deceleration information presentation unit 258 determines the mode of presenting the acceleration and deceleration information according to the acceleration and deceleration status. Specifically, the acceleration and deceleration information presentation unit 258 presents the acceleration and deceleration information in a mode in which the acceleration and deceleration information is emphasized more during deceleration than during acceleration. Further, the second task control unit 259 increases the degree of restriction on the execution of the second task when the acceleration and deceleration control is the deceleration control than when the acceleration and deceleration control is the acceleration control.

Figure 16:
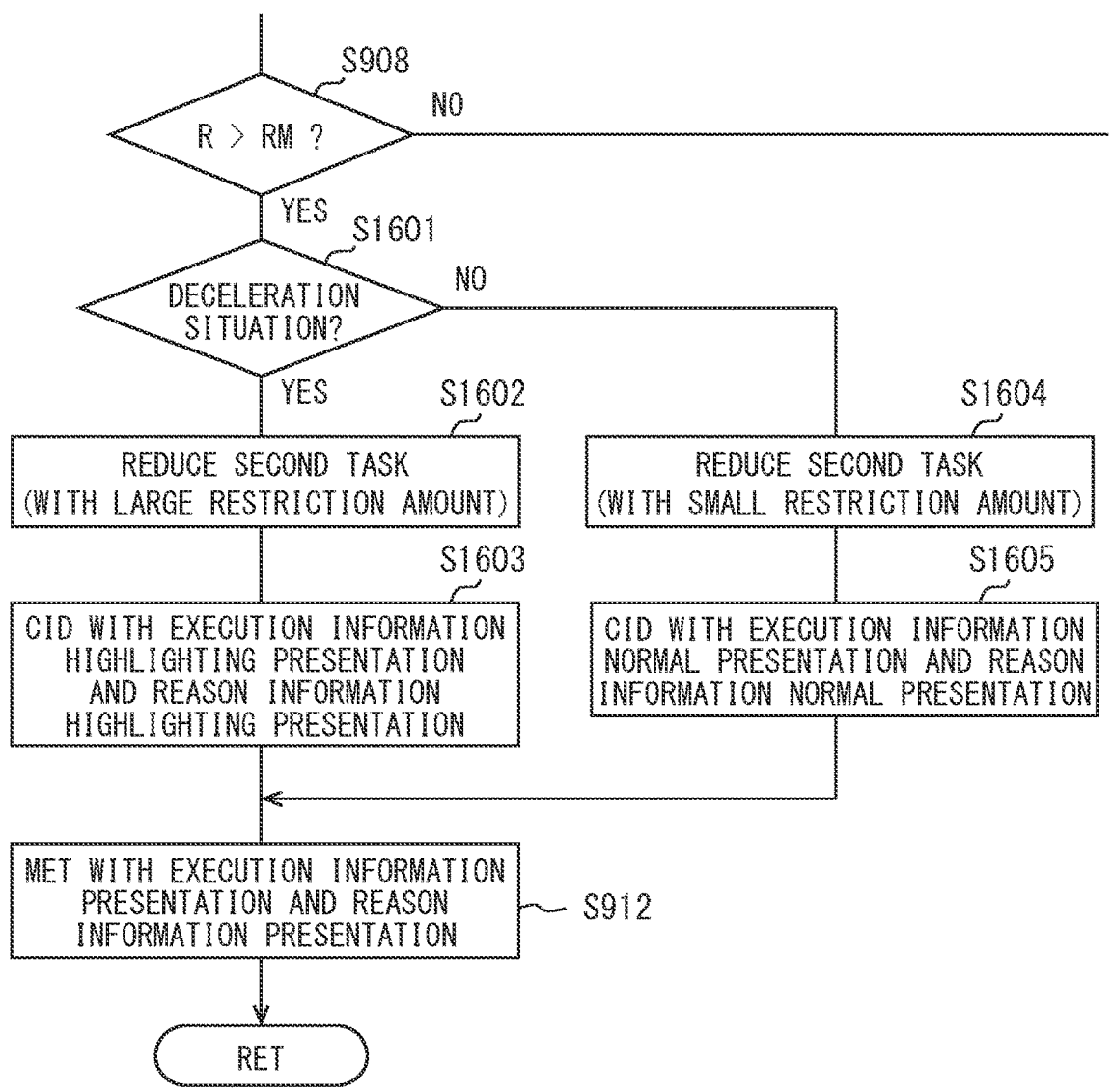
FIG. 16 is a flowchart showing an outline of an operation example of the HMI control device according to the fifth embodiment.

FIG. 16 shows, when the flowchart of FIG. 9 corresponding to the first embodiment is transformed into the embodiment corresponding to the present embodiment, the transformed portion and the peripheral portion thereof which are extracted. That is, FIG. 16 is a partially changed from FIG. 15.

When the amount of control in the acceleration and deceleration control during or scheduled to be executed is medium (that is, "YES" in step S908), the CPU advances the process to step S1601. In step S1601, the CPU determines whether the acceleration and deceleration control is acceleration control or deceleration control.

In the case of a deceleration scene (that is, "YES" in step S1601), the CPU executes the processes of steps S1602 and S1603, and then advances the processes to step S912. On the other hand, in the case of an acceleration scene (that is, "NO" in step S1601), the CPU executes the processes of steps S1604 and S1605, and then advances the processes to step S912. That is, the processing contents of steps S1601 to S1605 correspond to a specific example of the processing contents of step 910 in FIG. 9.

In step S1602, the CPU sets the execution restriction amount of the second task to "large". That is, the processing content of step S1602 is the same as the processing content of step S1502 shown in FIG. 15. At step S1603, the CPU presents execution information and reason information in an emphasized manner by the CID device 23. Specifically, the CPU highlights the execution information and the reason information in the screen area D of the CID device 23. In addition, the CPU executes a voice warning or notification.

In step S1604, the CPU sets the execution restriction amount of the second task to "small". That is, the processing content of step S1604 is the same as the processing content of step S1503 shown in FIG. 15. At step S1605, the CPU presents execution information and reason information in a normal manner by the CID device 23. Specifically, the CPU normally displays the execution information and the reason information in the screen area D of the CID device 23. On the other hand, the CPU does not execute a voice warning or notification.

Sixth Embodiment

Hereinafter, a sixth embodiment will be described. The configuration of the in-vehicle system 10 according to the present embodiment is the same as that of the first embodiment. However, in this embodiment, the operation mode and the functional configuration corresponding thereto are slightly different from those in the fourth embodiment.

For example, if a driver with a poor sitting posture does not monitor the surroundings of the vehicle by executing a second task, the driver may feel uncomfortable due to unexpected acceleration and deceleration. On the other hand, the driver who monitors the surroundings of the own vehicle can predict the possibility of acceleration and deceleration control depending on the specific scene or road shape as described above to some extent, so that a situation for the driver feeling uncomfortable due to unexpected acceleration and deceleration is unlikely to occur.

Therefore, in the present embodiment, the second task control unit 259 determines the execution restriction mode of the second task according to the driver state. Specifically, the second task control unit 259 increases the execution limit amount of the second task when the driver state is poor rather than when the driver state is good. The "good" state of the driver means that the driver is in a driving posture, that is, a sitting posture that allows the driver to immediately shift to manual driving, and is monitoring the surroundings of the own vehicle. On the other hand, the state in which the driver state is "bad" means a state in which the above-mentioned driving posture or peripheral monitoring conditions are not satisfied.

Figure 17:
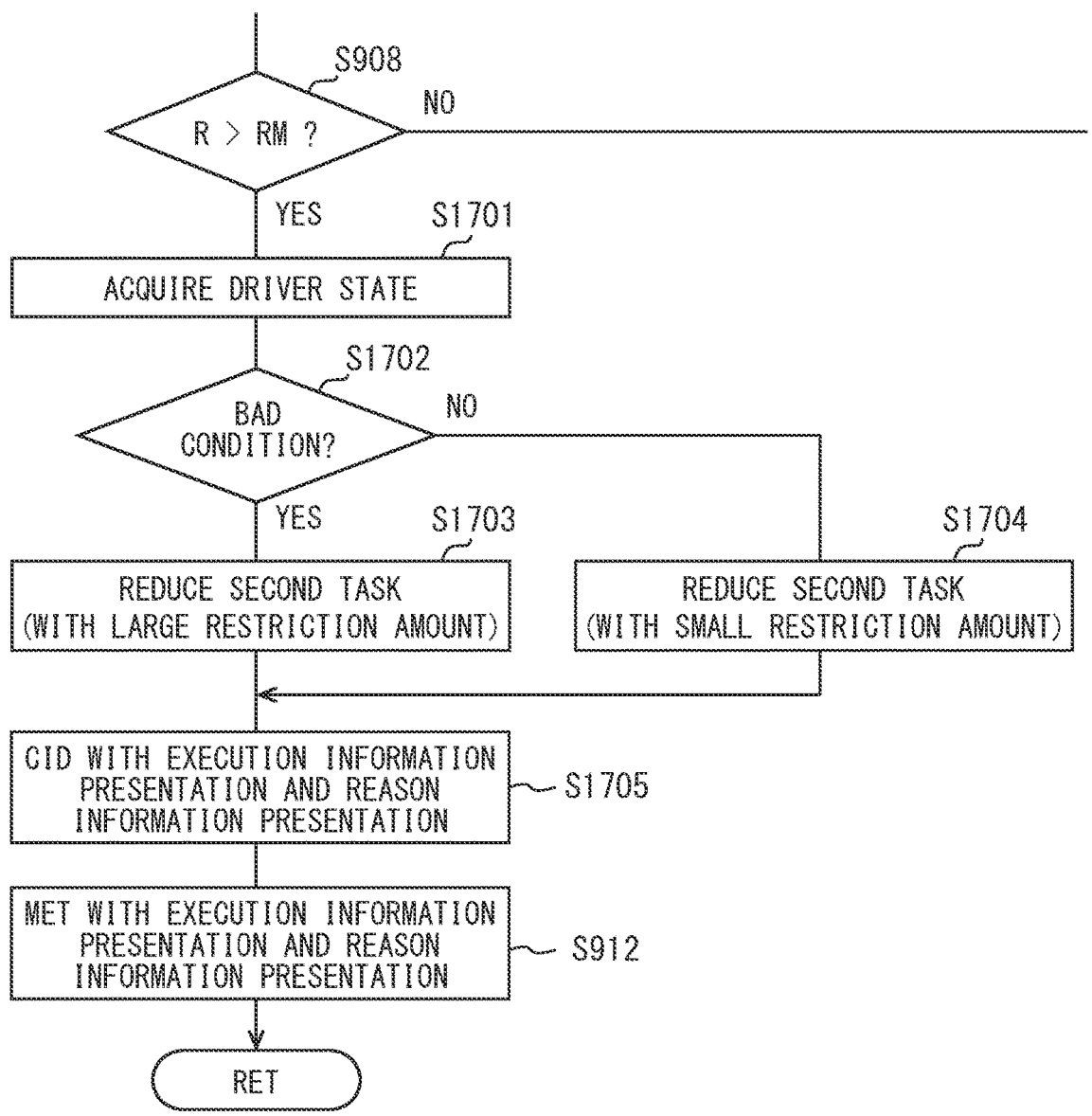
FIG. 17 is a flowchart showing an outline of an operation example of the HMI control device according to the sixth embodiment.

FIG. 17 shows, when the flowchart of FIG. 9 corresponding to the first embodiment is transformed into the embodiment corresponding to the present embodiment, the transformed portion and the peripheral portion thereof which are extracted. When the amount of control in the acceleration and deceleration control during or scheduled to be executed is medium (that is, "YES" in step S908), the CPU advances the process to steps S1701 and S1702.

At step S1701, the CPU acquires the driver state. The processing content of step S1701 is the same as the processing content of step S1401. At step S1702, the CPU determines the driver state. That is, the CPU determines whether the driver state is good or bad.

If the driver state is bad (i.e., "YES" in step S1702), the CPU advances the process to step S1703. In step S1703, the CPU sets the execution restriction amount of the second task to "large". That is, the processing content of step S1703 is the same as the processing content of step S1502 shown in FIG. 15.

If the driver state is good (i.e., "NO" in step S1702), the CPU advances the process to step S1704. In step S1704, the CPU sets the execution restriction amount of the second task to "small". That is, the processing content of step S1704 is the same as the processing content of step S1503 shown in FIG. 15.

After executing the process of step S1703 or step S1704 depending on the driver state, the CPU advances the process to step S1705. In step S1705, the CPU displays execution information and reason information in the screen area D of the CID device 23, and executes information presentation by voice as necessary. After that, the CPU advances the process to step S912. That is, the processing contents of steps S1701 to S1705 correspond to a specific example of the processing contents of step 910 in FIG. 9.

Seventh Embodiment

Hereinafter, a seventh embodiment will be described. The configuration of the in-vehicle system 10 according to the present embodiment is the same as that of the first embodiment. However, in this embodiment, the operation mode and the functional configuration corresponding thereto are slightly different from those in the sixth embodiment.

Also in this embodiment, the second task control unit 259 determines the execution restriction mode of the second task according to the driver state, as in the sixth embodiment. Specifically, the second task control unit 259 lowers the degree of limitation of the second task when the driver is monitoring the vicinity of the own vehicle than when the driver is not monitoring the vicinity of the own vehicle. More specifically, the second task control unit 259 releases the restriction on the second task earlier when the driver is monitoring the vicinity of the own vehicle than when the driver is not monitoring the vicinity of the own vehicle.

Figure 18:
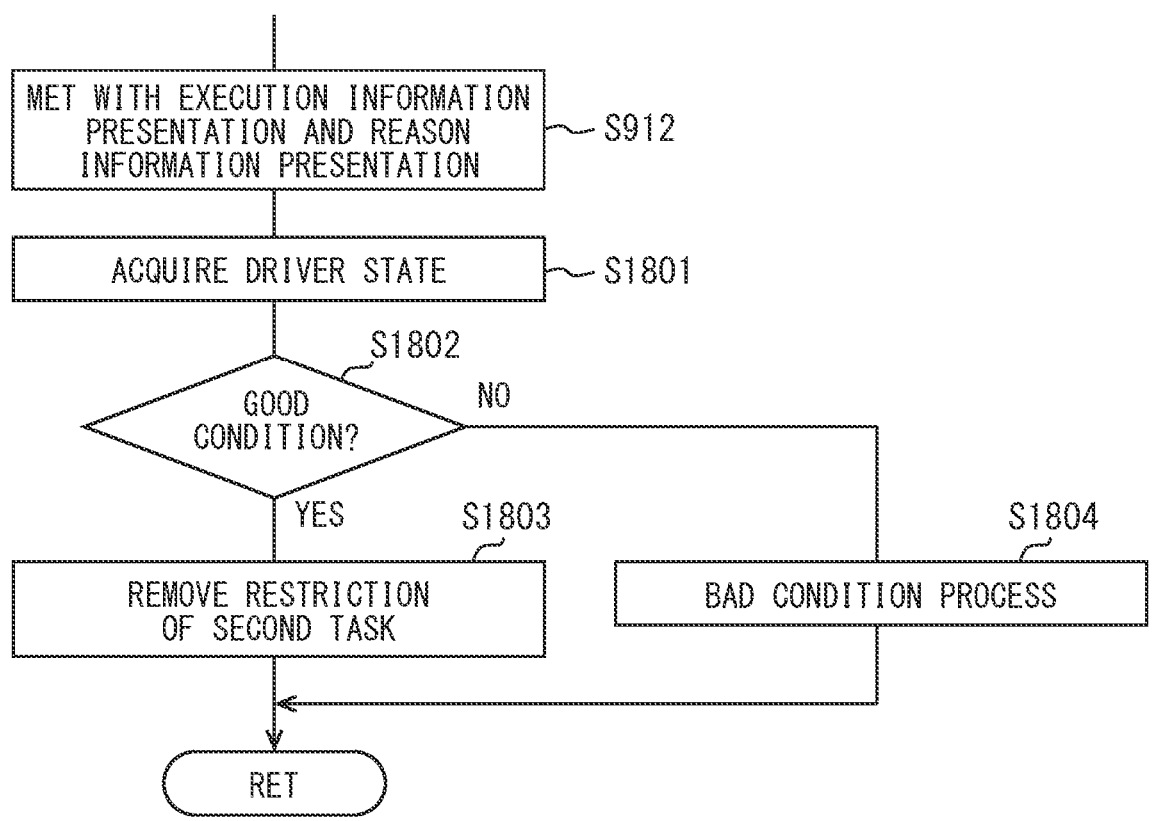
FIG. 18 is a flowchart showing an outline of an operation example of the HMI control device according to the seventh embodiment.

FIG. 18 shows, when the flowchart of FIG. 9 corresponding to the first embodiment is transformed into the embodiment corresponding to the present embodiment, the transformed portion and the peripheral portion thereof which are extracted. When the process of step S912 is completed, the CPU advances the process to steps S1801 and S1802.

At step S1801, the CPU acquires the driver state. That is, the processing content of step S1801 is the same as the processing content of step S1401 shown in FIG. 14 and step S1701 shown in FIG. 17. At step S1802, the CPU determines the driver state. That is, the CPU determines whether the driver state is good or bad.

When the driver state is good (that is, "YES" in step S1802), the CPU temporarily terminates this routine after executing the process of step S1803. At step S1803, the CPU releases the restriction on the second task.

When the driver state is bad (that is, "NO" in step S1802), the CPU temporarily terminates this routine after executing the process of step S1804. At step S1804, the CPU executes a process different from that of step S1803. Specifically, the CPU continues the limitation of the second task for a predetermined period. Alternatively, the CPU prevents the restriction on the second task from being released unless the driver presses a predetermined confirmation button. Further, the CPU displays more traffic information in the vicinity than usual in the screen area D of the CID device 23.

Modifications Examples

The present disclosure is not necessarily limited to the above embodiment. Thus, it is possible to appropriately change the above-described embodiment. Hereinafter, typical modifications will be described. In the following description of the modifications, parts different from the above embodiment will be mainly described. In addition, in the above-described embodiment and the modifications, the same reference numerals are given to the same or equivalent parts. Therefore, in the following description of the modifications, with respect to constituent elements having the same reference numerals as those in the embodiments, the description in the above embodiments can be appropriately incorporated unless there is a technical contradiction or a special additional description.

The present disclosure is not limited to the specific device configuration described in the above embodiments. That is, for example, the vehicle mounted with the in-vehicle system 10 may not be limited to an ordinary passenger vehicle 1. Specifically, the vehicle 1 may be a large vehicle such as a freight truck. The number of wheels is not particularly limited, and may be a three-wheeled vehicle or a six-wheeled or eight-wheeled vehicle such as a freight truck. The type of the vehicle 1 may be a conventional vehicle including only an internal combustion engine, an electric vehicle or a fuel cell vehicle not including an internal combustion engine, or a so-called hybrid vehicle. The shape and structure of the vehicle body in the vehicle 1 are not limited to a box shape, that is, a substantially rectangular shape in a plan view. There are no particular restrictions on the use of the vehicle 1, the position of the driver's seat 2, that is, the steering wheel 8 in the vehicle width direction, the number of occupants, and the like. The presence of the driver's seat 2 may not be also essential. That is, the driver may be an own vehicle occupant who is in charge of or executes a dynamic driving task. In other words, as long as the driver can perform the driving operation, there is no particular limitation on the seating position of the driver. Further, any operating device such as a joystick may be used in place of or in combination with the steering wheel 8.

As the communication standard constituting the in-vehicle system 10, a communication standard other than CAN (international registered trademark), for example, FlexRay (internationally registered trademark) or the like may be adopted. The communication standard constituting the in-vehicle system 10 may not be limited to one type. For example, the in-vehicle system 10 may have a subnetwork line conforming to a communication standard such as LIN. LIN stands for Local Interconnect Network.

The vehicle state sensor 11, the external state sensor 12, and the surrounding monitoring sensor 13 may be also not limited to the above examples. For example, the periphery monitoring sensor 13 may include sonar, that is, an ultrasonic sensor. Alternatively, the periphery monitoring sensor 13 may include two or more types of millimeter-wave radar sensor, a sub-millimeter-wave radar sensor, a laser radar sensor, and an ultrasonic sensor. The number of various sensors installed may not be particularly limited.

The locator 14 may not be also limited to the above examples. For example, the locator 14 may not have the configuration incorporating the gyro sensor and the acceleration sensor. Specifically, the inertia acquisition unit 142 may receive output signals from an angular velocity sensor and an acceleration sensor provided outside the locator 14 as the vehicle state sensor 11.

DCM15 may be omitted. That is, the traffic information can be obtained by the navigation device 16. Alternatively, the navigation device 16 may have a configuration including the locator 14 and the DCM 15.

The navigation device 16 may be connected to the HMI control device 25 so as to be able to perform information communication via a sub-communication line different from the in-vehicle communication line 10A.

The navigation device 16 may have a display screen exclusive to navigation screen display different from the HMI device 20. Alternatively, the navigation device 16 may be provided as a part of the HMI device 20. Specifically, for example, the navigation device 16 may be integrated with the CID device 23.

The driver state detection unit 17 may be connected to the HMI control device 25 so that information can be communicated via a sub-communication line different from the vehicle-mounted communication line 10A.

The driver state detection unit 17 may not be limited to the configuration including the line-of-sight detection unit 171, the posture detection unit 172, and the operation state detection unit 173. That is, for example, the function corresponding to the posture detection unit 172 can be achieved by image recognition using the configuration of the line-of-sight detection unit 171. Further, the driver state detection unit 17 may include a biometric information sensor that detects biometric information such as the driver's pulse. In this case, the component such as the detection electrode in the biological information sensor can be shared with the component for detecting the gripping state of the steering wheel 8 in the operation state detection unit 173.

In the above embodiment, the in-vehicle system 10, that is, the drive control device 18, is configured to be able to execute the vehicle control operation corresponding to the levels 1 to 3. However, the present disclosure may not be limited to such an aspect. That is, for example, the present disclosure can be suitably applied to a case where a vehicle control operation corresponding to each of Levels 1 to 5 can be performed.

Further, in the above embodiment, the in-vehicle system 10 is able to execute "high-speed autonomous driving" and "traffic jam autonomous driving". However, the present disclosure may not be limited to such an aspect. That is, for example, the in-vehicle system 10 may be capable of executing only high-speed autonomous driving. Alternatively, the in-vehicle system 10 may be capable of executing only traffic jam autonomous driving.

The above embodiment is described based on a road traffic system in which both "high-speed autonomous driving" and "traffic jam autonomous driving" are possible for convenience of explanation. In the road traffic system of each country, execution conditions of autonomous driving, such as the type of autonomous driving and the maximum speed during autonomous driving, can be appropriately considered corresponding to domestic circumstances and the like. For this reason, the above embodiments can be appropriately modified to specifications conforming to the road traffic system of each country.

Specifically, for example, the present disclosure can also be suitably applied to the road traffic system capable of performing autonomous driving corresponding to SAE level 3 on the condition that the vehicle travels in a predetermined low speed range (for example, 60 km/h or less) in a specific road section. Such autonomous driving may be referred to as "low-speed autonomous driving". Such low-speed autonomous driving can be executed during traffic congestion as well. The "traffic congestion" refers to a state where a line of vehicles repeating the low-speed traveling or the stopping and starting at a speed equal to or lower than a threshold speed continues to a predetermined extent, on the basis of the definitions of East Nippon Expressway Company Limited and Metropolitan Police Department. The threshold speed is, for example, 20 km/h on general roads and arterial roads, and 40 km/h on expressways. The "predetermined degree" is, for example, 1 km or more and 15 minutes or more.

Further, the level or category of driving automation in the present disclosure is not limited to those defined in "SAE J3016". Specifically, in "SAE J3016", it is defined that the higher the operation automation level is, the larger the level value is. However, the present disclosure may not be limited to such an aspect. That is, for example, the present disclosure may be similarly applied to a standard in which the highest level of automation is set to "level 1" and the level value increases as the level of automation decreases.

The HMI device 20 may not be limited to the configuration including the meter panel 21, the HUD device 22, and the CID device 23. That is, for example, the meter panel 21 and the CID device 23 can be integrated. Alternatively, the HUD device 22 or the CID device 23 may be omitted. If the CID device 23 is omitted, the second task may be performed exclusively by the terminal device 24. Alternatively, a display device for the second task screen DA, which replaces the CID display 231, may be provided on the ceiling of the vehicle body or the like.

The meter 211 and the meter display 212 may be realized by one display device. In this case, the meter 211 may be provided as a display area at both left and right ends of one flat panel display such as a liquid crystal display. That is, the meter 211 may be achieved by displaying, as images, a bezel, a pointer, a scale, and the like corresponding to a tachometer, a speedometer, a water temperature gauge, and the like. Further, the meter display 212 may be provided as a display area other than the meter 211 in such a flat panel display.

The input device 232 may include a pointing device or the like operated by the driver's hand instead of or in addition to the touch panel superimposed on the CID display 231. The input device 232 may include a voice input device that detects the utterance of the driver.

In the above embodiment, the drive control device 18 and the HMI control device 25 have a configuration as a so-called in-vehicle microcomputer equipped with a CPU and the like. However, the present disclosure may not be limited thereto.

For example, all or part of the drive control device 18 may be configured to include a digital circuit configured to enable the above-mentioned operation, for example, an ASIC or an FPGA. ASIC stands for Application Specific Integrated Circuit. The FPGA is an abbreviation for Field Programmable Gate Array. Further, in the drive control device 18, the in-vehicle microcomputer portion and the digital circuit portion may coexist. The same applies to the HMI control device 25.

The program according to the present disclosure capable of performing various operations, procedures, or processing described in the above embodiments can be downloaded or upgraded via V2X communication by the DCM 15 or the like. V2X is an abbreviation for Vehicle to X. Alternatively, such a program can be downloaded or upgraded via a terminal device provided in a vehicle manufacturing factory, a maintenance factory, a sales shop, or the like. The storage destination of such a program may be a memory card, an optical disk, a magnetic disk, or the like.

The above-described functional blocks and method according to the present disclosure may be implemented by one or more special-purposed computers. Such a special-purposed computer may be provided (i) by configuring (a) a processor and a memory programmed to execute one or more functions embodied by a computer program, Alternatively, the functional blocks and method described in the present disclosure may be implemented by a special purpose computer including a processor with one or more dedicated hardware logic circuits. Alternatively, the functional blocks and method described in the present disclosure may be implemented by a combination of (a) a processor and a memory programmed to execute one or more functions embodied by a computer program and (b) a processor including one or more dedicated hardware logic circuits. The computer program may be stored in a computer-readable non-transitory tangible storage medium as an instruction to be executed by the computer. That is, each of the above functional blocks and method can be implemented as a computer program including instructions for performing the above process, or can be implemented as a non-transitory tangible storage medium in which the computer program is stored.

The present disclosure is not limited to the specific functional configurations and operation examples described in the above embodiments. That is, the present disclosure is also satisfactorily applied during acceleration and deceleration control during autonomous driving of level 4 or higher.

In each of the above embodiments, the acceleration and deceleration control executed during the autonomous driving is unplanned such as congestion occurrence, congestion resolve, obstacle detection, and the like. However, the present disclosure may not be limited to such an aspect. That is, the present disclosure can be satisfactorily applied to planned acceleration and deceleration, for example, when passing through a point where the speed limit changes in a specific road section during high-speed autonomous driving.

In the above specific example, as a second task, an example in which viewing of video content by the CID device 23 is being executed is shown. However, the present disclosure may not be limited to such an aspect. That is, the present disclosure can be satisfactorily applied even when the second task using the terminal device 24 is being executed.

Specifically, for example, when viewing video content or executing a game on the terminal device 24 as a second task, the screen area D shown in FIG. 3 or the like corresponds to an image displayable area on the terminal device 24. In this case, the display size change of the second task screen DA and the display of the acceleration and deceleration information can be executed in the screen area D of the terminal device 24.

The display control unit 257, specifically, the acceleration and deceleration information presentation unit 258 may change the display location of the acceleration and deceleration information based on the detection result in the line-of-sight direction of the driver. Specifically, for example, the line-of-sight direction of the driver may change from the CID display 231 to the terminal device 24, or may change from the terminal device 24 to the CID display 231 In this case, the acceleration and deceleration information presentation unit 258 may switch the display destination of the acceleration and deceleration information between the CID display 231 and the terminal device 24 in response to the change in the line-of-sight direction of the driver.

In the example of FIG. 6, the display size of the second task screen DA may be a normal size. The same may apply to FIGS. 10 to 12.

The change in the display mode of the acceleration and deceleration information may be performed by using at least one of the position, the size, the color, the brightness, and the blinking mode.

The acceleration and deceleration status used for the determination of the presentation mode of the acceleration and deceleration information and/or the determination of the second task limitation may not be limited to the control amount or the planned control amount in the acceleration and deceleration control. That is, for example, a margin for avoidance control and/or stop control for a predetermined traffic obstacle (for example, an obstacle or the like) may be considered. The margin varies depending on, for example, the obstacle detection performance of the periphery monitoring sensor 13. The obstacle detection performance may be affected by the detection performance in a standard detection environment (for example, in fine weather) and the natural environment (for example, in rainy weather).

Specifically, for example, in the flowchart of FIG. 9, a step for determining whether or not the margin is equal to or greater than a threshold value may be inserted between steps S902 and S903. If the determination result in the margin determination step is "YES", the CPU advances the process to step S903. On the other hand, when the determination result in the margin determination step is "NO", the CPU advances the process to step S911.

The process of step S1315 may be omitted. That is, if the predetermined time has not elapsed since the execution of the acceleration and deceleration control is completed, the determination result in step S1305 is "YES". In this case, the CPU may proceed with the process to step S1316.

When the driver state detection unit 17 includes a biometric information sensor that detects biometric information such as a driver's pulse, such biometric information can be used to determine the adjustment value K in step S1402.

The execution restriction (for example, pause) of the second task at the time of acceleration and deceleration may be conditional on the input operation of approval by the driver.

Similar expressions such as "acquisition", "calculation", "estimation", "detection", "sensing", and "determination" may be appropriately replaced with each other within a range not technically contradictory. The "detection" or the "sensing" and the "extraction" may be appropriately replaced within a range not technically contradictory.

It goes without saying that in the above embodiments, the elements constituting the embodiment are not necessarily essential unless otherwise specified as essential or considered to be obviously essential in principle. When numerical values such as the number, amount, and range of constituent elements are mentioned, the present disclosure is not limited to the specific numerical values unless otherwise specified as essential or obviously limited to the specific numerical values in principle. Similarly, when the shape, direction, positional relationship, and the like of a constituent element or the like are mentioned, the present disclosure is not limited to the shape, direction, positional relationship, and the like unless otherwise specified as essential or limited to a specific shape, direction, positional relationship, and the like in principle.

The modifications are not limited to the above-described examples. For example, all or part of one of the embodiments and all or part of the other can be combined with each other as long as there is no technical conflict. There is no particular limitation on the number of combinations. Similarly, all or part of one of the variants and all or part of the other can be combined with each other as long as there is no technical conflict. Furthermore, all or a part of the above-described embodiments and all or a part of the modifications may be combined with each other under a condition that they are not technically inconsistent.

(Control Method and Control Program)

The present disclosure described in the above embodiments and modifications includes the following viewpoints concerning the HMI control method and the HMI control program. The following aspects can be applied in combination with each other so long as they are not technically inconsistent.

The HMI control method is a method of controlling an HMI device (20) that recognizably presents information by an occupant of a vehicle (1) capable of autonomous driving. The HMI control program is a program executed by the HMI control device (25) configured to control the HMI device (20) that presents information recognizably by the occupants of the vehicle (1) capable of automatic driving.

From the first point of view, the HMI control method and the process executed by the HMI control device includes:
- an acceleration and deceleration status acquisition unit that acquires an acceleration and deceleration status, which is an execution status of acceleration and deceleration control in the vehicle during autonomous driving; and
- an acceleration and deceleration information presentation unit that presents acceleration and deceleration information relating to the acceleration and deceleration status in an manner corresponding to the acceleration and deceleration status.

From the second point of view, the HMI control method and the process executed by the HMI control device further includes:
- a second task control process for controlling the execution state of the second task in the HMI device during autonomous driving operation.

The second task control process includes a process of limiting the execution of the second task according to the acceleration and deceleration status.

According to the third point of view, the second task control process includes a process of determining the execution restriction mode of the second task according to the type of the reason for the acceleration and deceleration control.

According to the fourth point of view, the second task control process includes a process of increasing the degree of restriction on execution of the second task when the acceleration and deceleration control is deceleration control than when the acceleration and deceleration control is acceleration control.

According to the fifth point of view, the second task control process includes a process of determining the execution restriction mode of the second task according to the state of the driver who is the occupant.

According to the sixth point of view, the second task control process includes a process of stopping the execution of the second task when the acceleration and deceleration situation is the execution or the execution schedule of the rapid acceleration and deceleration control.

According to the seventh point of view, when the second task is being executed by the display device (23) that visually displays the image by the occupant, the acceleration and deceleration information presentation process includes a process for setting the display mode of the acceleration and deceleration information in the display device according to the acceleration and deceleration status.

According to the eighth point of view, the acceleration and deceleration information presentation process includes a process for presenting execution information corresponding to the execution or execution schedule of the acceleration and deceleration control as the acceleration and deceleration information, and reason information corresponding to the reason for the acceleration and deceleration control.

According to the ninth point of view, the acceleration and deceleration information presentation process includes a process of presenting the execution information and the reason information at different timings.

According to the tenth point of view, the acceleration and deceleration information presentation process includes a process of presenting the time until the start of execution of the acceleration and deceleration control as the acceleration and deceleration information.

According to the eleventh point of view, the acceleration and deceleration information presentation process includes a process of presenting the acceleration and deceleration information in an manner corresponding to the state of the driver who is a occupant.

According to the twelfth point of view, the acceleration and deceleration information presentation process includes a process of determining a mode of presenting the acceleration and deceleration information according to the acceleration and deceleration situation.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S901. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A human machine interface (HMI) control device configured to control an HMI device that presents information recognizably by an occupant of a vehicle capable of autonomous driving, the HMI control device comprising:
   an acceleration and deceleration state acquisition unit that acquires an acceleration and deceleration state, which is an execution status of acceleration and deceleration control in the vehicle during autonomous driving; and
   an acceleration and deceleration information presentation unit that presents acceleration and deceleration information relating to the acceleration and deceleration state in a manner corresponding to the acceleration and deceleration state;
   a second task control unit that controls an execution state of a second task in the HMI device during autonomous driving and that limits an execution of the second task according to the acceleration and deceleration state; wherein:
   the acceleration and deceleration information presentation unit presents chronological time until a start of execution of one of acceleration and deceleration control as the acceleration and deceleration information; and
   the second task control unit increases a degree of restriction on the execution of the second task when the one of the acceleration and deceleration control is a deceleration control than when the one of the acceleration and deceleration control is an acceleration control.

2. The HMI control device according to claim 1, wherein: the second task control unit determines an execution restriction mode of the second task according to a type of a reason for the one of the acceleration and deceleration control.

3. The HMI control device according to claim 1, wherein: the second task control unit determines an execution restriction mode of the second task according to a state of a driver who is an occupant of the vehicle.

4. The HMI control device according to claim 1, wherein: the second task control unit stops the execution of the second task when the acceleration and deceleration state is an execution or an execution schedule of a rapid one of acceleration and deceleration control.

5. The HMI control device according to claim 1, wherein: when the second task is being executed by a display device that displays an image to an occupant of the vehicle visually recognizable, the acceleration and deceleration information presentation unit changes a display mode of the acceleration and deceleration information on the display device according to the acceleration and deceleration state.

6. The HMI control device according to claim 1, wherein: the acceleration and deceleration information presentation unit presents, as the acceleration and deceleration information, execution information corresponding to an execution or an execution schedule of the one of the acceleration and deceleration control, and reason information corresponding to a reason for the one of the acceleration and deceleration control.

7. The HMI control device according to claim 6, wherein: the acceleration and deceleration information presentation unit presents the execution information and the reason information at different timings.

8. The HMI control device according to claim 1, wherein: the acceleration and deceleration information presentation unit presents the acceleration and deceleration information in a manner corresponding to a state of a driver who is an occupant of the vehicle.

9. The HMI control device according to claim 1, wherein: the acceleration and deceleration information presentation unit determines a presentation mode of the acceleration and deceleration information according to the acceleration and deceleration state.

10. The HMI control device according to claim 1, further comprising:
    one or more processors; and
    a memory coupled to the one or more processors and storing program instructions that when executed by the one or more processors cause the one or more processors to provide at least: the acceleration and deceleration state acquisition unit; and the acceleration and deceleration information presentation unit.

11. A human machine interface (HMI) control device configured to control an HMI device that presents information recognizably by an occupant of a vehicle capable of autonomous driving, the HMI control device comprising:
    an acceleration and deceleration state acquisition unit that acquires an acceleration and deceleration state, which is an execution status of one of acceleration and deceleration control in the vehicle during autonomous driving;
    an acceleration and deceleration information presentation unit that presents acceleration and deceleration information relating to the acceleration and deceleration state in a manner corresponding to the acceleration and deceleration state; and
    a second task control unit that controls an execution state of a second task in the HMI device during autonomous driving, wherein:
    the second task control unit limits an execution of the second task according to the acceleration and deceleration state; and
    the second task control unit increases a degree of restriction on the execution of the second task when the one of the acceleration and deceleration control is a deceleration control than when the one of the acceleration and deceleration control is an acceleration control.

12. The HMI control device according to claim 11, further comprising:
one or more processors; and
a memory coupled to the one or more processors and storing program instructions that when executed by the one or more processors cause the one or more processors to provide at least: the acceleration and deceleration state acquisition unit; the acceleration and deceleration information presentation unit; and the second task control unit.

13. A human machine interface (HMI) control device configured to control an HMI device that presents information recognizably by an occupant of a vehicle capable of autonomous driving, the HMI control device comprising:
an acceleration and deceleration state acquisition unit that acquires an acceleration and deceleration state, which is an execution status of one of acceleration and deceleration control in the vehicle during autonomous driving;
an acceleration and deceleration information presentation unit that presents acceleration and deceleration information relating to the acceleration and deceleration state in a manner corresponding to the acceleration and deceleration state; and
a second task control unit that controls an execution state of a second task in the HMI device during autonomous driving, wherein:
the second task control unit limits an execution of the second task according to the acceleration and deceleration state;
the second task control unit determines an execution restriction mode of the second task according to a state of a driver who is an occupant of the vehicle; and
the second task control unit increases a degree of restriction on the execution of the second task when the one of the acceleration and deceleration control is a deceleration control than when the one of the acceleration and deceleration control is an acceleration control.

14. The HMI control device according to claim 13, further comprising:
one or more processors; and
a memory coupled to the one or more processors and storing program instructions that when executed by the one or more processors cause the one or more processors to provide at least: the acceleration and deceleration state acquisition unit; the acceleration and deceleration information presentation unit; and the second task control unit.

15. A human machine interface (HMI) control device configured to control an HMI device that presents information recognizably by an occupant of a vehicle capable of autonomous driving, the HMI control device comprising:
an acceleration and deceleration state acquisition unit that acquires an acceleration and deceleration state, which is an execution status of one of acceleration and deceleration control in the vehicle during autonomous driving; and
an acceleration and deceleration information presentation unit that presents acceleration and deceleration information relating to the acceleration and deceleration state in a manner corresponding to the acceleration and deceleration state; and
a second task control unit that controls an execution state of a second task in the HMI device during autonomous driving and that limits an execution of the second task according to the acceleration and deceleration state;
wherein:
the acceleration and deceleration information presentation unit presents the acceleration and deceleration information in a manner corresponding to a state of a driver who is an occupant of the vehicle; and
the second task control unit increases a degree of restriction on the execution of the second task when the one of the acceleration and deceleration control is a deceleration control than when the one of the acceleration and deceleration control is an acceleration control.

16. The HMI control device according to claim 15, further comprising:
one or more processors; and
a memory coupled to the one or more processors and storing program instructions that when executed by the one or more processors cause the one or more processors to provide at least: the acceleration and deceleration state acquisition unit; and the acceleration and deceleration information presentation unit.

17. A non-transitory tangible computer readable storage medium comprising instructions being executed by a computer, the instructions including a computer-implemented method for controlling a human machine interface (HMI) device that presents information recognizably by an occupant of a vehicle capable of autonomous driving, the instructions including:
acquiring an acceleration and deceleration state, which is an execution status of one of acceleration and deceleration control in the vehicle during autonomous driving; and
presenting acceleration and deceleration information relating to the acceleration and deceleration state in a manner corresponding to the acceleration and deceleration state;
controlling an execution state of a second task in the HMI device during autonomous driving and limiting an execution of the second task according to the acceleration and deceleration state; and
increasing a degree of restriction on the execution of the second task when the one of the acceleration and deceleration control is a deceleration control than when the one of the acceleration and deceleration control is an acceleration control;
wherein the presenting of the acceleration and deceleration information includes presenting chronological time until a start of execution of one of acceleration and deceleration control as the acceleration and deceleration information.

18. A non-transitory tangible computer readable storage medium comprising instructions being executed by a computer, the instructions including a computer-implemented method for controlling a human machine interface (HMI) device that presents information recognizably by an occupant of a vehicle capable of autonomous driving, the instructions including:
acquiring an acceleration and deceleration state, which is an execution status of one of acceleration and deceleration control in the vehicle during autonomous driving; and
presenting acceleration and deceleration information relating to the acceleration and deceleration state in a manner corresponding to the acceleration and deceleration state
controlling an execution state of a second task in the HMI device during autonomous driving and limiting an execution of the second task according to the acceleration and deceleration state; and increasing a degree of restriction on the execution of the second task when the one of the acceleration and deceleration control is a deceleration control than when the one of the acceleration and deceleration control is an acceleration control;
wherein the presenting of the acceleration and deceleration information includes presenting the acceleration and deceleration information in a manner corresponding to a state of a driver who is an occupant of the vehicle.

* * * * *